US007051029B1

(12) United States Patent
Fayyad et al.

(10) Patent No.: US 7,051,029 B1
(45) Date of Patent: May 23, 2006

(54) IDENTIFYING AND REPORTING ON FREQUENT SEQUENCES OF EVENTS IN USAGE DATA

(75) Inventors: Usama Fayyad, Mercer Island, WA (US); Neal Rothleder, Kirkland, WA (US); Cheng Yang, Mountain View, CA (US)

(73) Assignee: Revenue Science, Inc., Bellevue, WA (US)

( * ) Notice: Subject to any disclaimer, the term of this patent is extended or adjusted under 35 U.S.C. 154(b) by 1289 days.

(21) Appl. No.: 09/755,971

(22) Filed: Jan. 5, 2001

(51) Int. Cl.
*G06F 17/30* (2006.01)
(52) U.S. Cl. .................. 707/10; 707/102; 715/513
(58) Field of Classification Search ............ 707/1–10, 707/100–104.1, 200–205; 715/513
See application file for complete search history.

(56) References Cited

U.S. PATENT DOCUMENTS 6,667,751 B1 * 12/2003 Wynn et al. ............... 715/833
2004/0133551 A1 * 7/2004 Linstedt ..................... 707/1

OTHER PUBLICATIONS

Rakesh Agrawal and Ramakrishnan Srikant, "Fast Algorithms for Mining Association Rules," Proceedings of the 20th VLDB Conference, Santiago, Chile, 1994.
Rakesh Agrawal et al., "Fast Discovery of Association Rules," Advances in Knowledge Discovery and Data Mining, 1996.

Ashok Savasere et al., "An Efficient Algorithm for Mining Association Rules in Large Databases," VLDB '95, Proceedings of the 21st International Conference on Very Large Data Bases, Zurich, Switzerland, Sep. 11-15, 1995.
Rakesh Agrawal, "Mining Association Rules Between Sets of Items in Large Databases," Proceedings of the 1993 ACM SIGMOD International Conference on Management of Data, SIGMOD '93, Washington, DC, May 26-28, 1993.
Heikki Mannila et al., "Discovery of Frequent Episodes in Event Sequences," Feb. 1997.
Rakesh Agrawal and Ramakrishnan Srikant, "Mining Sequential Patterns," Eleventh International Conference on Data Engineering, Mar. 6-10, 1995, Taipei, Taiwan.

* cited by examiner

*Primary Examiner*—Mohammad Ali
(74) *Attorney, Agent, or Firm*—Perkins Coie LLP

(57) ABSTRACT

A method, system, and computer-readable medium for identifying sequences of interaction events of interest that frequently occur is described. In particular, techniques are described for receiving multiple groups each having related interaction events in serial or sequential order, and for determining sequences of interaction events that frequently occur in the multiple groups. Reports can also be generated and provided that include information about the determined frequent sequences. The techniques can at times be used to provide a service to customers in which logs containing data about interaction events related to that customer (e.g., usage events for a provided service or of a provided Website) are received or obtained, in which frequent sequences in the log data are identified, and in which reports are provided to representatives of the customer about the frequent sequences (e.g., remotely over the Web based on interactive specifications).

43 Claims, 31 Drawing Sheets

Example User/Website Interaction Data
(sorted by user and browsing session)

| User (122) | Browsing Session (123) | Interaction Element Identifier (124) |
|---|---|---|
| 1 | 1 | I-103 |
| 1 | 1 | I-104 |
| 1 | 3 | I-101 |
| 1 | 3 | I-102 |
| 1 | 3 | I-102 |
| 2 | 4 | I-101 |
| 2 | 4 | I-102 |
| 2 | 4 | I-102 |
| 3 | 5 | I-103 |
| 3 | 5 | I-104 |
| 3 | 7 | I-102 |
| 3 | 7 | I-104 |
| 3 | 7 | I-103 |
| 4 | 6 | I-101 |
| 4 | 6 | I-104 |
| 4 | 6 | I-102 |
| 4 | 6 | I-103 |
| 4 | 6 | I-102 |
| 4 | 6 | I-105 |
| 5 | 2 | I-101 |
| 5 | 2 | I-102 |
| 5 | 2 | I-103 |
| 5 | 2 | I-104 |
| 5 | 2 | I-106 |
| 5 | 2 | I-107 |
| ... | ... | ... |
| 5 | 2 | I-149 |
| 5 | 2 | I-150 |

*Fig. 1B*

Example Interaction Element Session Frequency

| Interaction Element Identifier (126) | Sessions With Interaction (128) |
|---|---|
| I-102 | 5 |
| I-103 | 5 |
| I-104 | 5 |
| I-101 | 4 |
| I-105 | 1 |
| I-106 | 1 |
| I-107 | 1 |
| ... | |
| I-149 | 1 |
| I-150 | 1 |

*Fig. 1C*

Example Frequency Sequence Tree
Node Data Structures

| | 183 | 184 |
|---|---|---|
| 171 | Node ID | I-104 143 |
| 172 | Node Parent ID | ROOT 130 |
| 173 | Node Children ID List | I-101 146, I-102 147, I-103 148, I-104 149 |
| 174 | Session Counter | 4 |
| 175 | Sequence Length | 1 |
| 176 | Last Sequence Element | I-104 |
| 177 | Token | Yes |
| 178 | Next Linked Node | - |
| 179 | User Counter | 3 |
| 180 | Number of Original Intervening Elements | 0 |
| 181 | Cumulative Sequence Interval Time | 0 |
| | ... | |

185 ⟶

190

| | 186 | 187 |
|---|---|---|
| | Node ID | I-103 148 |
| | Node Parent ID | I-104 143 |
| | Node Children ID List | - |
| | Session Counter | 1 |
| | Sequence Length | 2 |
| | Last Sequence Element | I-103 |
| | Token | No |
| | Next Linked Node | - |
| | User Counter | 1 |
| | Number of Original Intervening Elements | 0 |
| | Cumulative Sequence Interval Time | 1.0 units |
| | ... | |

| | 186 | 187 |
|---|---|---|
| | Node ID | I-103 148 |
| | Node Parent ID | I-104 143 |
| | Node Children ID List | - |
| | Session Counter | 2 |
| | Sequence Length | 2 |
| | Last Sequence Element | I-103 |
| | Token | Yes |
| | Next Linked Node | - |
| | User Counter | 2 |
| | Number of Original Intervening Elements | 1 |
| | Cumulative Sequence Interval Time | 3.7 units |
| | ... | |

Example Frequent 2-Length Sequence Matrix

|  | I-101 | I-102 | I-103 | I-104 |
|---|---|---|---|---|
| I-101 | 0 | 4 | 2 | 2 |
| I-102 | 0 | 3 | 3 | 2 |
| I-103 | 0 | 1 | 0 | 3 |
| I-104 | 0 | 1 | 2 | 0 | first element / second element 192, 193

Example User/Website Interaction Data (sorted by time)

| User | Browsing Session | Interaction Event Identifier | Interaction Time | Interaction Event Category | Interaction Event Price |
|---|---|---|---|---|---|
| 1 | 1 | I-103 | x+01.0 | Book | High |
| 5 | 2 | I-101 | x+02.0 | CD | Low |
| 1 | 1 | I-104 | x+02.4 | Clothes | Medium |
| 5 | 2 | I-102 | x+03.0 | CD | Medium |
| 5 | 2 | I-103 | x+04.6 | Book | High |
| 1 | 3 | I-101 | x+05.0 | CD | Low |
| 2 | 4 | I-101 | x+05.9 | CD | Low |
| 5 | 2 | I-104 | x+06.2 | Clothes | Medium |
| 1 | 3 | I-102 | x+06.5 | CD | Medium |
| 3 | 5 | I-103 | x+07.0 | Book | High |
| 2 | 4 | I-102 | x+07.1 | CD | Medium |
| 1 | 3 | I-102 | x+08.0 | CD | Medium |
| 3 | 5 | I-104 | x+08.2 | Clothes | Medium |
| 4 | 6 | I-101 | x+08.5 | CD | Low |
| 4 | 6 | I-104 | x+09.8 | Clothes | Medium |
| 2 | 4 | I-102 | x+10.0 | CD | Medium |
| 4 | 6 | I-102 | x+10.9 | CD | Medium |
| 3 | 7 | I-102 | x+11.2 | CD | Medium |
| 4 | 6 | I-103 | x+12.5 | Book | High |
| 3 | 7 | I-104 | x+13.0 | Clothes | Medium |
| 4 | 6 | I-102 | x+13.7 | CD | Medium |
| 3 | 7 | I-103 | x+14.0 | Book | High |
| 4 | 6 | I-105 | x+14.9 | TV | Very High |
| 5 | 2 | I-106 | x+15.5 | Book | High |
| 5 | 2 | I-107 | x+16.5 | Clothes | Medium |
| ... | ... | ... | ... | ... | ... |
| 5 | 2 | I-149 | x+18.6 | Clothes | Medium |
| 5 | 2 | I-150 | x+19.9 | Clothes | Medium |

IDENTIFYING AND REPORTING ON FREQUENT SEQUENCES OF EVENTS IN USAGE DATA

TECHNICAL FIELD

The following disclosure relates generally to the field of data reporting, and, more particularly to the field of usage and interaction data reporting in contexts such as users browsing a Website, users utilizing a service, or users providing search or transaction requests to Web servers.

BACKGROUND

The World Wide Web ("the Web") provides a forum for obtaining information and engaging in commercial transactions. In order to provide information and/or solicit a commercial transaction via the Web, a company or other Web publisher establishes a Website. In order to establish a Website, the publisher typically connects its own server computer system to the Internet, or secures the use of a server computer system already connected to the Internet. This server executes a Web server program to deliver Web pages and associated data to users via the Internet in response to their requests. Users make such requests using client computer systems, which are often connected to the Internet via an Internet Service Provider ("ISP").

As a diagnostic and monitoring measure, some Web server programs maintain a log of the requests that they receive and the actions that they take in response. In some situations, such logs may additionally contain a variety of other information about any type of interaction that a user or computer has with the Web server or the Website provided by the server. Although such logs can contain useful information for analyzing users' interactions with a Website or a Web server, such information can be difficult to extract from Web server log files. Such Web server log files are typically very large, often measured in megabytes or gigabytes; they are full of extraneous information; their content is expressed in a terse form that is difficult to understand; and they are formatted in a manner that makes their content difficult to visually discern. Information about groups of Web pages commonly visited in sequence by users, such as to display information about particular products or to purchase particular products, can be especially difficult to extract from Web server files as these groupings may be interspersed among other events and over time, and almost never appear near each other in a log file. An additional complication is that Websites are typically served by multiple servers, and hence the record of a single user's session of interactions with a Website could appear in multiple separate log files over the course of the session. This further complicates the reconstruction of information and the extraction of patterns of interest.

In performing reporting over web logs or over other types of usage or interaction logs, it can be useful to determine aggregated information such as total number of users, total number of transactions, etc. Often, these numbers are computed and broken down by category and by region or by some other pre-defined partition. It would also be of great use in a variety of situations to be able to determine series or sequences of events of interest that frequently occur and to know the total number of occurrences for such sequences. As used herein, a series of events is a list of consecutive events in the order of their occurrence, and a sequence of events is a list of events in the order of their occurrence but not necessarily in consecutive order. Thus, every series is a sequence, but not every sequence is a series.

As an illustrative example of series and sequences, if a user views Web page A followed by page B followed by page C followed by page D, then the ordered expressions {A,B,C,D}, {C,D}, and {C} all accurately describe series of Web viewing interaction events by that user, but the expressions {A,C,D}, {A,B,E,C,D}, {E}, and {D,C} do not accurately describe series. Similarly, the ordered expressions <A,B,C,D>, <C,D>, <C>, and <A,C,D> all accurately describe sequences of Web viewing interaction events by that user, but the expressions <A,B,E,C,D>, <E>, and <D,C> do not accurately describe sequences. As is shown, since order is relevant in a series or sequence, series {C,D} is different from series {D,C} and sequence <C,D> is different from sequence <D,C>. It should also be noted that sequences can occur multiple times in a group of related events. For example, if a user views Web page A followed by page B followed by page C followed by page B, then the sequence <A,B,B> occurs only once but the sequence <A,B> occurs twice (i.e., Web page A followed by the first viewing of Web page B, and Web page A followed by the second viewing of Web page B).

However, while information about series or sequences of events of interest that frequently occur would be of great use to customers, standard reports about usage and interaction events do not typically provide such information. In particular, information about series of events is not typically computed because its number grows very large and becomes unwieldy, and sequences of events are even more difficult to determine than series. As an example, with only a very small number of 10 possible interaction events, there are 10 possible sequences of length 1, 100 possible sequences of length 2, 1000 possible sequences of length 3, and the number continues to grow exponentially as $10^X$ possible sequences of length X (e.g., 1,000,000 possible sequences of length 6). Thus, to check a group of interaction events to determine all of the possible sequences of a small length such as 6 or less events that are present in the group, it may be necessary to scan the group of interaction events 1,111, 110 times to check for each possible sequence.

Accordingly, an automated facility for identifying sequences of events of interest that frequently occur, such as for groups of Web pages of a Website, would have significant utility.

DETAILED DESCRIPTION

Figure 1A:
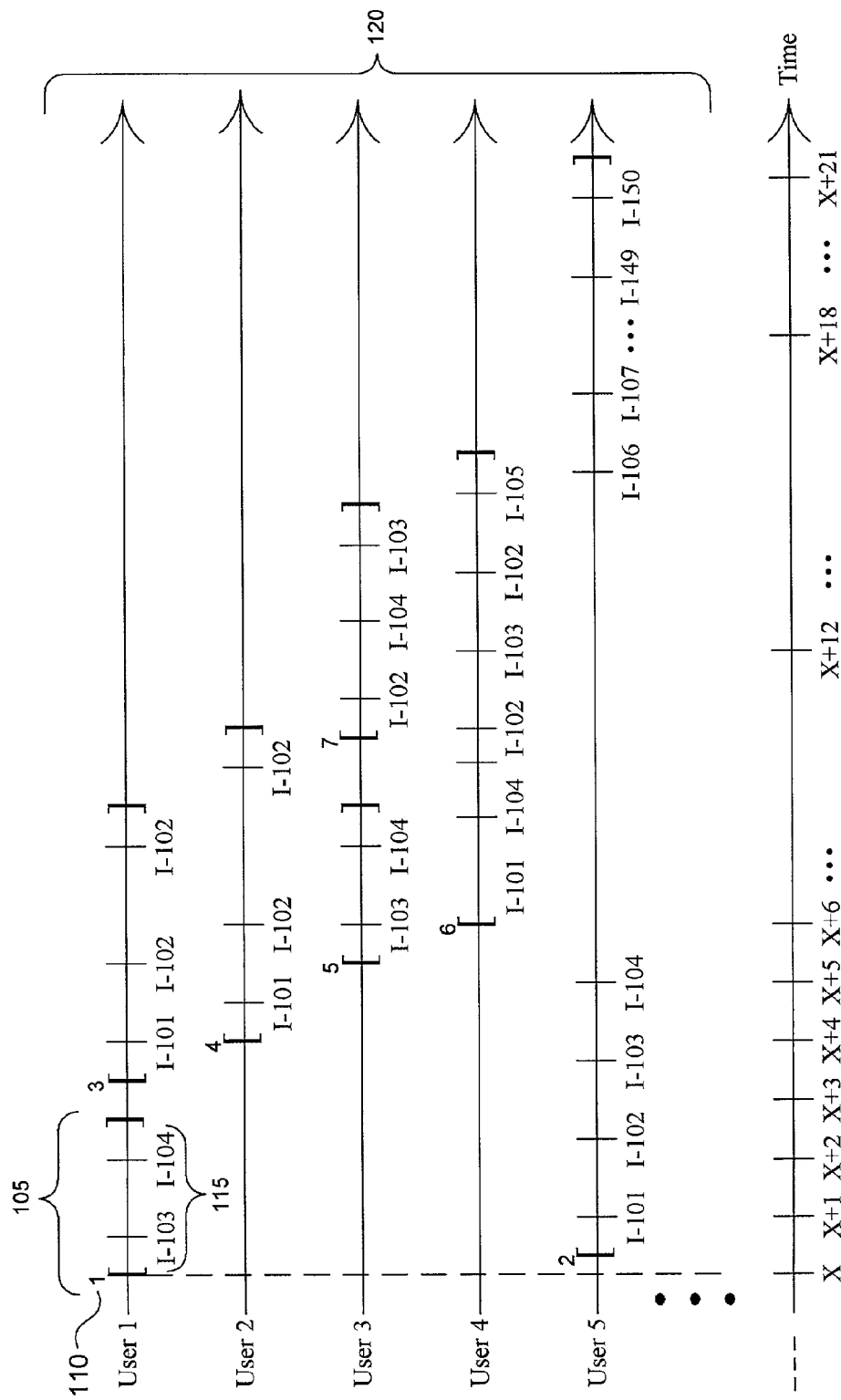
FIGS. 1A–1Z provide examples of using techniques of the invention for identifying frequent sequences of interaction events.

A software facility is described below that identifies sequences of interaction events of interest that frequently occur. In particular, the Frequent Sequence Determination (FSD) system is a facility that receives multiple groups each having related interaction events in serial or sequential order, and determines sequences of interaction events that frequently occur in the multiple groups. The system can also generate and provide reports that include information about the determined frequent sequences.

In some embodiments, the system provides a service to customers in which the system receives or obtains logs containing data about interaction events related to that customer (e.g., usage events for a provided service or of a provided Website), determines the frequent sequences in the log data, and provides reports to representatives of the customer about the frequent sequences (e.g., remotely over the Web based on interactive specifications). For such a customer, such as an operator of a Website, identifying the most frequently visited sequences of Web pages or groups of Web pages enables the operator to better understand how the Website is being used by users. This information may be used by the operators to, for example, reorganize the Website to better adapt it to the way in which users have been using it, or to formulate an advertising campaign, a sale, a contest promotion, or other like initiatives to generate traffic to under-visited areas of the subject Website.

As mentioned previously, it is difficult to determine frequent sequences due to the large number of possible sequences—both the amount of computer memory and the amount of time required can make many such determination attempts impractical or impossible. As an example, a brute-force method of determining frequent sequences would involve identifying every possible interaction event, and then checking each group of interaction events for each possible sequence of each possible length to determine if that sequence is present in the group. However, such an approach is impractical unless the number of possible interaction events, possible sequence lengths, and number and size of the groups of interaction events are all extremely small. While the size and complexity of different types of usage or interaction event data will vary, as an example many Websites have hundreds or thousands of possible interaction events, have log data for different user sessions numbering in the thousands or even millions, and have lengths of possible sequences in the tens or hundreds.

Thus, in order to make the determination of frequent sequences practical in a timely manner, it is desirable to limit both the number of possible interaction events that are considered and the number of times each group of interaction events is checked to determine if sequences are present. The FSD system correspondingly limits both of these factors when possible, and can determine frequent sequences of interaction events in multiple ways as described in greater detail below.

In particular, in some embodiments the FSD system first analyzes the various groups of interaction events to determine individual interaction events that frequently occur in the groups (e.g., are in at least a predetermined minimum threshold number of the groups, or are within a predetermined percentage of the total possible events that occur most frequently), since only those individual events that are frequent can be present in frequent sequences of greater lengths. If the number of frequent individual interaction events ("frequent singletons") is sufficiently small (e.g., less than 100 when 1–2 gigabytes of memory is available), the system constructs a data structure representing all of the possible sequences that include only frequent singletons and are within a maximum sequence length, and then validates each possible sequence by analyzing each group of interaction events once in a single pass to determine each of the possible sequences that are present in that group. After all of the groups of interaction events are analyzed, each possible sequence has an associated number of occurrences representing the number of groups in which the sequence was present, and the frequent sequences among the possible sequences can be chosen (e.g., those sequences whose numbers are above a predetermined threshold, or a predetermined number or percentage of the sequences having the largest associated occurrence numbers).

A variety of types of data structures can also be used to represent the possible sequences, although a tree data structure can be efficiently used where each node (or "element") of the tree other than the root node represents a frequent singleton. Using this tree data structure, each node of the tree has an associated possible sequence of frequent singletons based on the frequent singletons represented by each of the nodes in the path from the root node to the node. Such a data structure is described in greater detail with respect to FIGS. 1A–1Z.

One variation for some of the previously described embodiments trades additional processing time for reduced memory usage by further limiting the number of possible sequences in the data structure to be created. In particular, after the frequent singletons are determined but before the data structure is created, each of the groups of interaction events is analyzed at least once to determine the frequent sequences of a small length (e.g., 2 or 3 interaction events) that are frequently present in the groups. Since frequent sequences of greater lengths are composed of various combinations of the shorter length frequent sequences, possible sequences in the data structure being created will be removed (or not added) if they contain a subsequence of the shorter length that is not one of the frequent subsequences. For example, consider a situation in which the frequent singletons are A, B, C, and D, and the frequent subsequences of length 2 are <A,B>, <A,D>, <B,C>, and <C,B>. Thus, a sequence such as <A,B,D> will not be considered because the subsequence <B,D> is not frequent.

In other embodiments (e.g., if the number of frequent singletons is not sufficiently small), the FSD system determines frequent sequences in an incremental manner by repeatedly generating groups of new possible sequences based on shorter sequences that were previously determined to be frequent. After each new group of possible sequences is generated, the system validates the possible sequences by analyzing each group of interaction events once to determine each of the possible sequences that are present in that group of interaction events. For example, if the various groups of interaction events were previously analyzed to determine the frequent singletons, the system can construct a data structure (e.g., a tree data structure) representing all of the possible sequences that begin with the frequent singletons and have a small number (e.g., 1) of additional frequent singletons following. Thus, if the frequent singletons are A, B, and C, and the length of the possible sequences is 2, each of the possible sequences <A,A>, <A,B>, <A,C>, <B,A>, <B,B>, <B,C>, <C,A>, <C,B>, and <C,C> will be represented in the data structure. After each new group of possible sequences is validated, the frequent sequences among the group of possible sequences can be chosen and a new group of possible sequences of greater lengths can be generated based on those chosen frequent sequences. The system can continue to generate and validate groups of possible sequences in this manner until a maximum sequence length is reached or until none of the generated possible sequences is found to be a frequent sequence.

For illustrative purposes, some embodiments of the software facility are described below in which the log data is generated by one or more Web servers and reflects interactions of various users with the Web pages of a Website provided by the Web servers. In these embodiments, the Web pages that are visited during a single visit to the Website by a user, called a "session," can be determined and used as the groups of related interaction events. However, those skilled in the art will appreciate that the techniques of the invention can be used in a wide variety of other situations, some of which are discussed below, and that the invention is not limited to interaction data for a Website or to using interaction event groups that are based on user sessions.

As an illustrative example of the use of the FSD system, consider the groups of related interaction events 120 illustrated in FIG. 1A. In this illustrative example, each interaction event represents a Web page of a Website that is "served" to a requesting user, also called a "page view," with the data reflecting these page views being stored in a log for the Website. As is illustrated, 5 users interacted with the Website in 7 different browsing sessions during a period of time ranging from time X to time X+21. In particular, User 1 began the first browsing session 105 at time X, and conducted two interaction events I-103 and I-104 during the session. In this illustrated embodiment, each browsing session is delimited by brackets 115, and includes an indicator 110 indicating the number of the browsing session in the order in which the sessions began. After completing session 1, User 1 also later began and completed browsing session 3 during which three interaction events occurred. Interaction events with the same name (e.g., interaction events I-103 by User 1 in browsing session 1 and I-103 by User 3 in browsing session 5) indicate the same interaction event (e.g., viewing the same Web page). Those skilled in the art will appreciate that multiple browsing sessions by multiple users can occur at the same time, and that the illustrated interaction data reflects only a small subset of typical Website interaction data for the purposes of illustration.

FIG. 1B illustrates a summary of the interaction data shown in FIG. 1A, with the interaction events sorted by user and then by browsing session. In some embodiments, the FSD system may receive the raw log data and then extract and sort the relevant interaction data, while in other embodiments the FSD system may receive the extracted sorted interaction data. In the illustrated embodiment, the system obtains extracted sorted interaction data as shown in which each group of interaction events has an associated user and browsing session indicator. Visual indicators 121 separate each browsing session for convenient identification. Those skilled in the art will appreciate that when extracting data from a log, different browsing sessions by a single user can be determined in various ways (e.g., by considering a new session to have begun for an interaction when a period of time greater than a threshold has expired since the last interaction by the user, or based on user logins and logouts).

FIG. 1C indicates the frequency that each interaction event occurs in the browsing sessions. In the illustrated embodiment, only the first occurrence of an interaction event in a browsing session is counted—thus, for example, interaction event I-102 is only counted once for browsing session 3 despite its occurrence twice in the session. In addition, a predetermined minimum threshold of 3 has been chosen in the illustrated embodiment for determining frequent singletons and frequent sequences. Thus, as is visually shown by indicator 125, the frequent singletons are I-101, I-102, I-103, and I-104. Those skilled in the art will appreciate that with actual log data there will typically be significantly larger browsing sessions and larger numbers of browsing sessions, and that correspondingly there will typically be larger numbers of frequent singletons and a larger threshold for determining frequency.

Figure 1D:
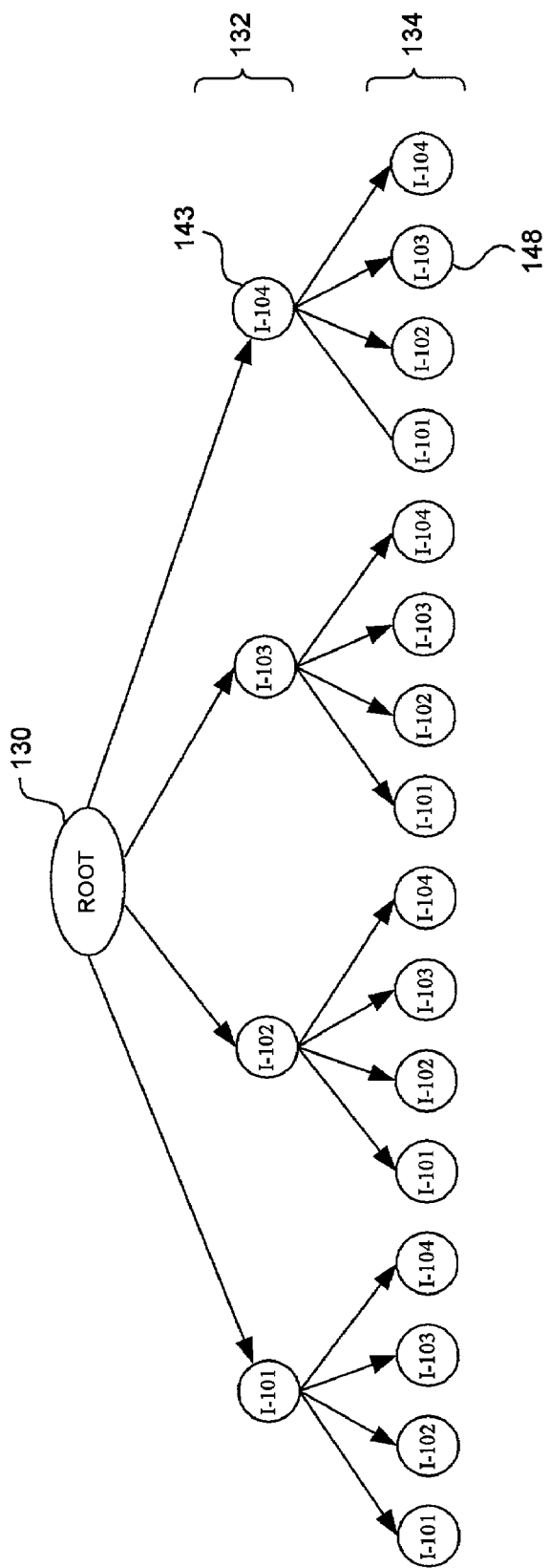

FIGS. 1D–1N illustrate techniques for incrementally determining the frequent sequences that are present in the illustrated interaction event groups. In particular, FIG. 1D illustrates a data structure for use in the incremental determination, which in the illustrated embodiment is a tree data structure shown having a root node 130, a lower-level group of first-level children nodes 132 with a node representing each of the frequent singletons, and a lowest-level group of second-level nodes 134 with a child node representing each of the frequent singletons for each of the first-level nodes. As previously mentioned, each node of the tree has an associated sequence based on the frequent singletons represented by each of the nodes in the path from the root node to the node. Thus, for example, node 143 represents interaction event I-104 and has an associated sequence <I-104> (since it is the only node in the path from the root node to itself), and node 148 represents interaction event I-103 and has an associated sequence <I-104,I-103>.

In the illustrated embodiment using the incremental determination technique, the FSD system begins by determining the frequent singletons, and then generates the group of second-level nodes 134 as possible sequences (or "candidates") that may be frequent sequences. Each candidate sequence is formed in this illustrated embodiment by adding a single additional frequent sequence to each previously identified frequent sequence of the next shorter length (i.e., the frequent singletons in this example). The FSD system next validates the candidate sequences against the groups of interaction events to determine the frequent sequences, as illustrated in FIGS. 1E–1H.

Figure 1E:
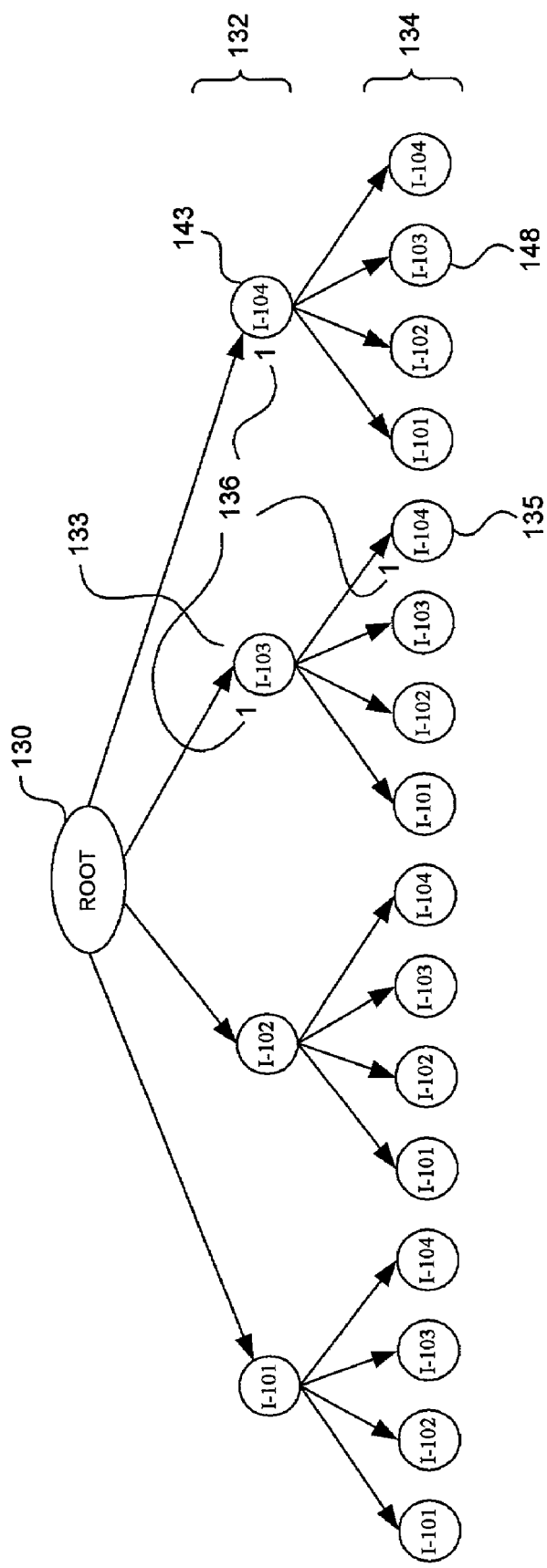

FIG. 1E illustrates the data structure after browsing session 1 is analyzed. As is shown, the nodes in the tree data structures have associated counters 136 that indicate the number of browsing sessions in which the sequence associated with the node has been found to be present during the validation process. Those skilled in the art will appreciate that before validating the nodes against any of the interaction event groups, the counters for all of the nodes will typically be initialized (e.g., set to 0). As is shown, nodes 133, 143, and 135 each were found to have associated sequences that were present in browsing session 1, those sequences being <I-103>, <I-104>, and <I-103, I-104> respectively. In the illustrated embodiment, counters with an initialized value of 0 are not displayed. Note that although interaction events I-103 and I-104 are both present in browsing session 1, the sequence <I-104, I-103> (represented by node 148) is not found o be present in the browsing session. Those skilled in the art will also appreciate that a sequence associated with a second-level node such as node 135 cannot occur in a session unless the sequence associated with the node's parent has already occurred in the session. Thus, the counters associated with the first-level nodes will always be at least as high as the counters associated with their second-level node children.

To validate the candidate sequences of the data structure against a session, the interaction events could be read from the session once for each candidate sequence to determine if the sequence is present. However, if the interaction events in the session are tracked as they are read from the session, it is possible to validate all of the candidate sequences with only a single reading of the session. In particular, if the sequences that have already occurred in the session are tracked, then the new sequences that are represented by the next interaction event in the session include the frequent singleton for that interaction event and any of those previously occurring sequences followed by that next interaction event. Since only the first occurrence of a sequence is counted in the illustrated embodiment, it is also necessary to be able to determine the nodes whose counters have already been incremented during the session so that a second occurrence of the associated sequence for that node is not counted again.

In some embodiments, the occurrence of sequences within a session are tracked by associating a token with each node in the data structure when the sequence associated with the node is first detected in the session (and thus when the counter associated with the node is incremented). Thus, if a sequence is detected but the node with which the sequence is associated already has a token, the counter for that node will not be incremented again. Those skilled in the art will appreciate that in such embodiments the presence of the tokens in the data structure should typically be initialized (e.g., by removing all tokens) before each session is validated. Since the nodes with tokens also represent those sequences that have occurred in the session, the possible sequences represented by the next interaction event in the session can be determined by identifying child nodes of nodes with tokens in which the child node represents the interaction event. The nodes with tokens can be determined in various ways, such as by searching the tree for such nodes when each interaction event is read or instead maintaining a data structure from which the nodes with tokens can be determined.

Figure 1F:
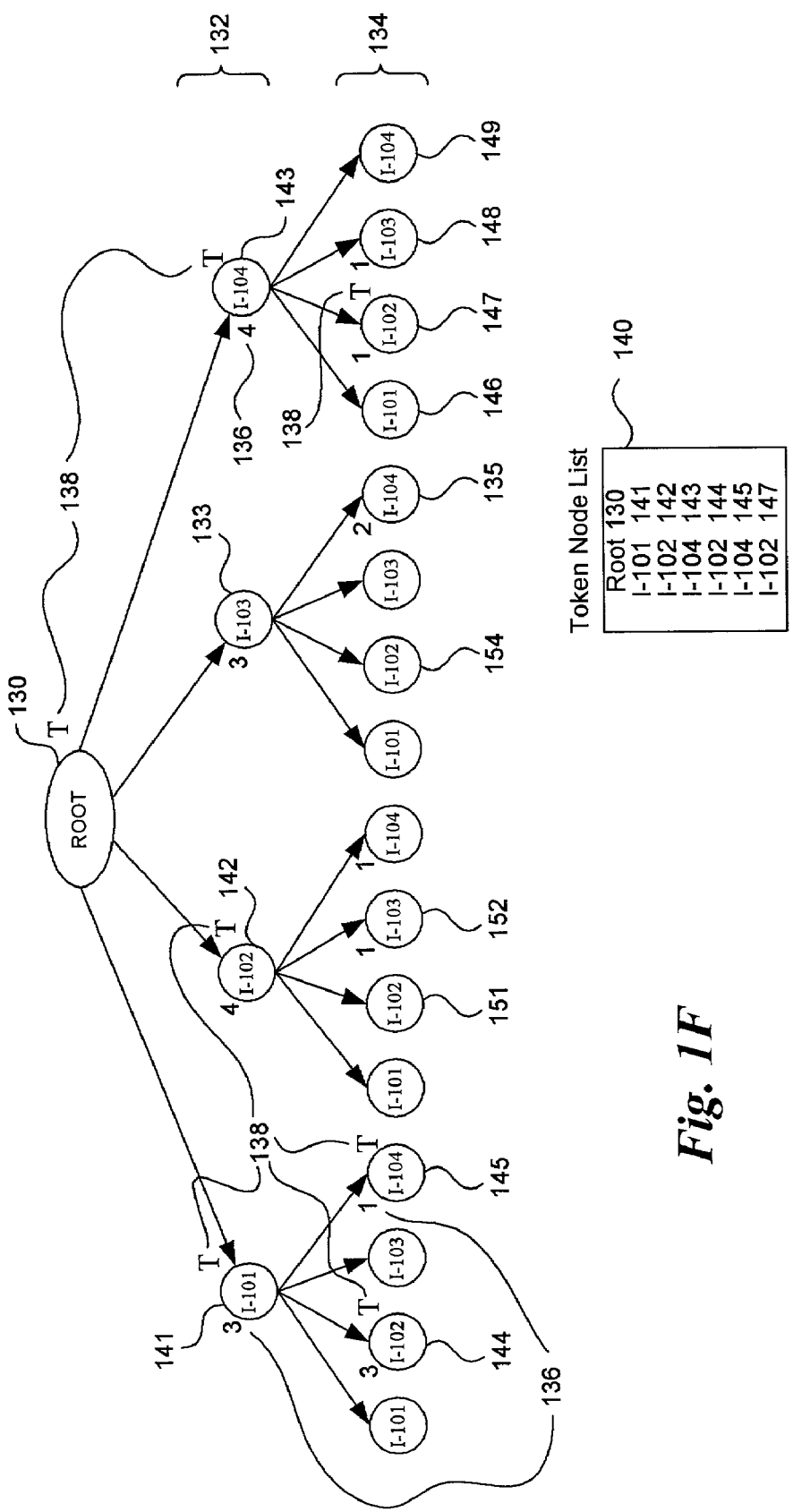

FIG. 1F illustrates the use of tokens as the tree data structure is validated against browsing session 6, and in particular illustrates the state of the data structure just before the fourth interaction event (i.e., I-103) is to be read from the session. Before validation against the session first began, all of the tokens are removed from the tree except for the root node. When the first interaction event I-101 is read from the session, the children of all nodes with tokens (i.e., initially only the root node) that represent the interaction event I-101 are identified, that being node 141. Since node 141 does not yet have a token, the counter 136 for node 141 is incremented and a token 138 is associated with the node. As is shown, the value of the counter after the incrementing is 3 since the sequence <I-101> was already determined to be present in browsing sessions 3 and 4 that were already validated. In the illustrated embodiment, a list data structure 140 is maintained to facilitate identification of the tokens with nodes, and thus an indication of node I-101 141 is added to the list and joins an indication of root node 130 that was added when the token was added to the root node.

When the next interaction event I-104 is read from the session, nodes 143 and 145 are identified both as being children of nodes with tokens and as representing the interaction event. Since neither node has a token 138 at that time, tokens are added to both nodes and the counters associated with both nodes are incremented. The fact that the counter associated with node 145 has the value of 1 after the incrementing indicates that the sequence <I-101,I-104> did not occur in any of the browsing sessions 1–5 that were previously validated. Nodes 143 and 145 are both added to the token node list. When the next interaction event I-102 is read from the session, nodes 142, 144 and 147 are identified as the matching child nodes of nodes with tokens. Since none of the nodes already have tokens, each node has a token associated with it and has its counter incremented, and indications of the nodes are added to the node token list. Thus, the sequences identified so far in the session include <I-101>, <I-104>, <I-101, I-104>, <I-102>, <I-101, I-102>, and <I-104, I-102>. Although the sequence <I-101, I-104, I-102> is also present in the session, it is not yet represented by a node in the tree data structure since only sequences of length 2 are being validated.

Similar processing follows for each of the remaining interaction events in the session. In particular, for the next interaction event I-103, several nodes including node 133 have tokens associated with them and have their counters incremented. It is useful to note how the use of the tokens prevents multiple occurrences of a sequence in a session from being counted more than once. For example, the next interaction event I-102 represents the second occurrence of sequences such as <I-102>, <I-101, I-102>, and <I-104,I-102> in the session, but the first occurrence of sequences <I-102,I-102>, and <I-103,I-102>. Correspondingly, the nodes that are identified for interaction event I-102 both as being children of nodes with tokens and representing I-102 include first-level node 142 and second-level nodes 144, 147, 151 and 154. However, nodes 142, 144 and 147 (associated with the previously occurring sequences <I-102>, <I-101,I-102>, and <I-104,I-102>) already have tokens, and thus do not have their counters incremented again.

Note that after the occurrence of interaction event I-103 and the corresponding receipt by node 133 of a token, each of the first-level children nodes of the root node have tokens. Since none of the children nodes thus need to continue to be checked for later interaction events (e.g., node 142 did not need to be checked for the second I-102 interaction event), in some embodiments the root node will be removed as a node whose children are checked. In particular, as long as such a node will not itself be checked again in the sequence (and thus cannot have its associated counter incremented again), the token associated with the node can be removed.

Figure 1G:
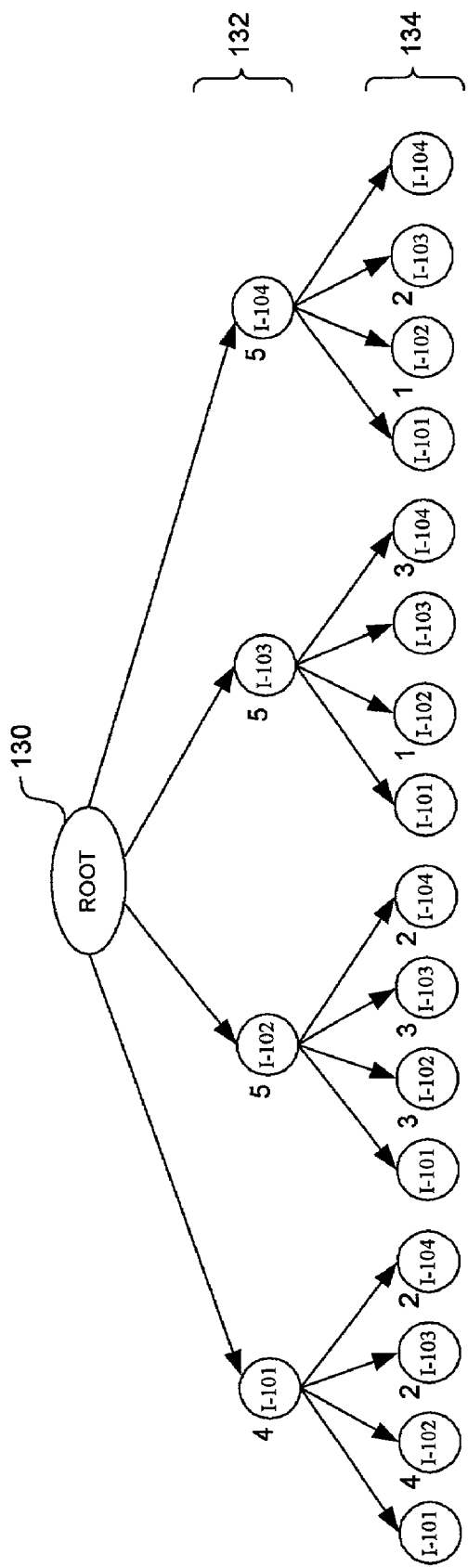
Figure 1H:
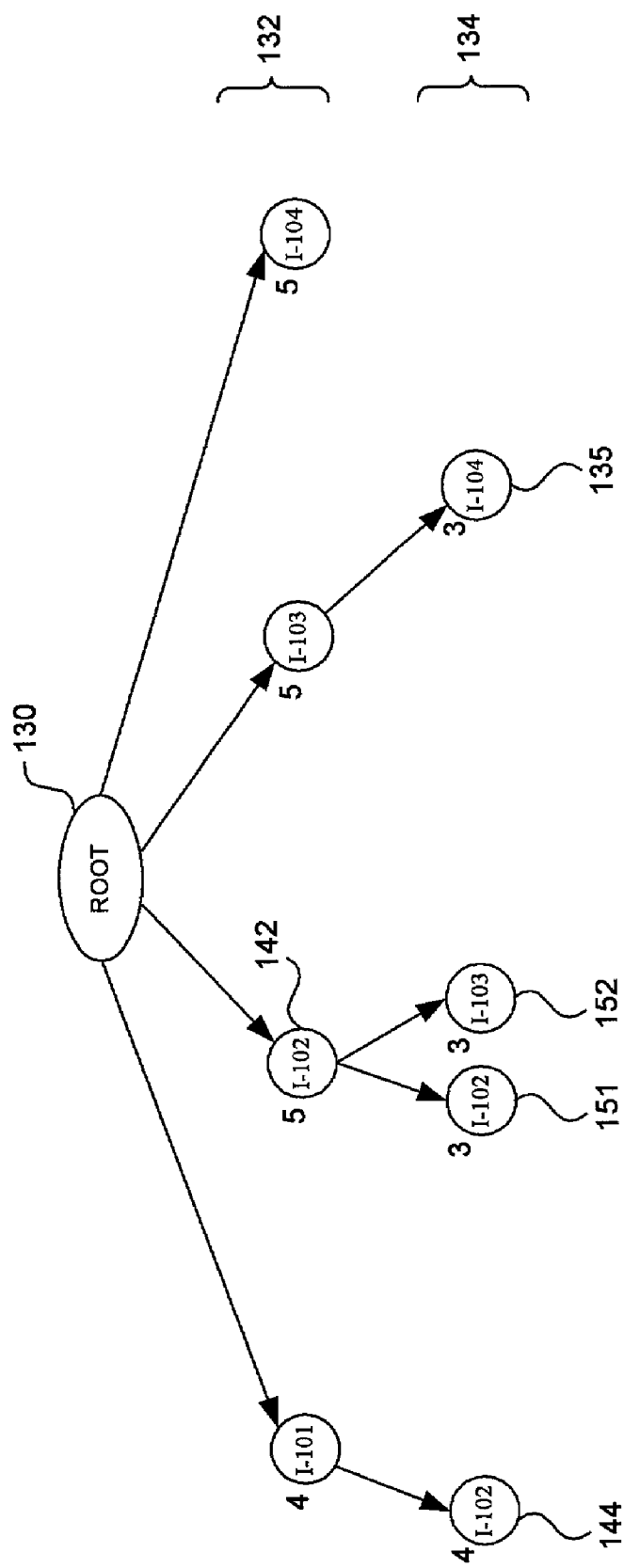
Figure 1I:
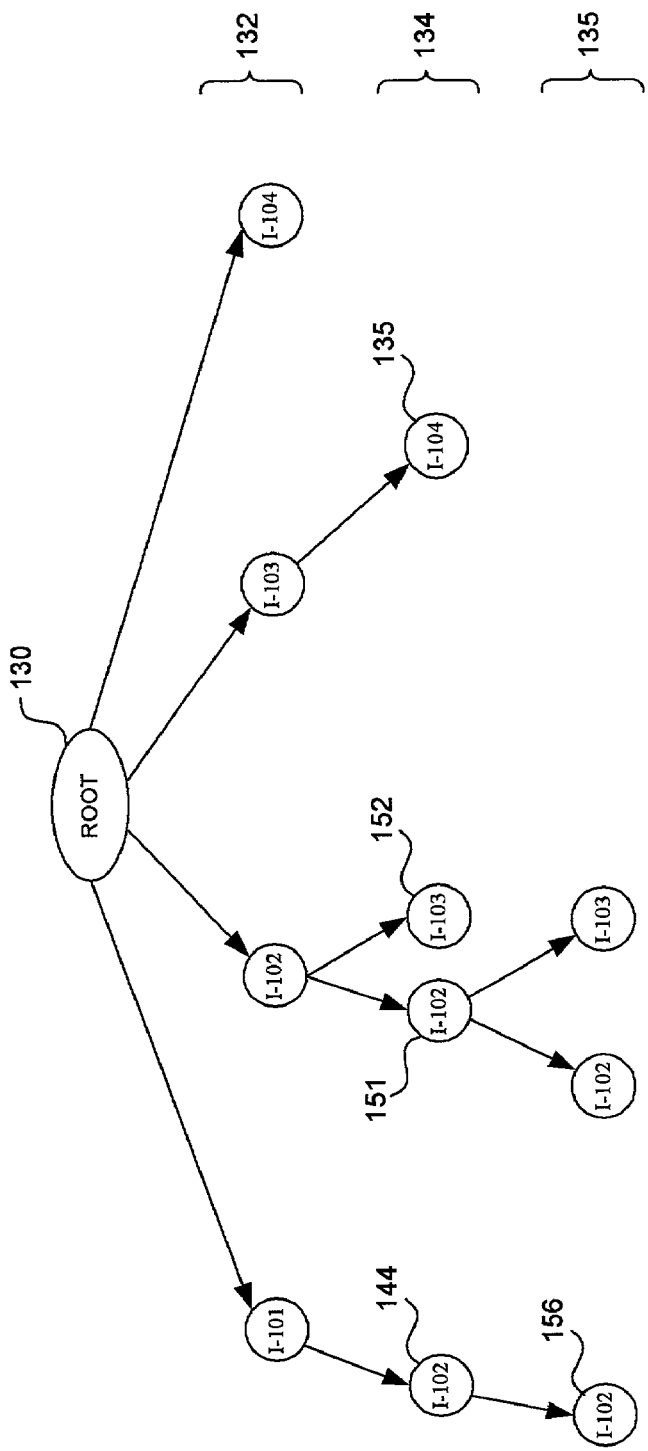

FIG. 1G illustrates the values of the counters associated with the nodes after the candidate sequences are validated against each of the browsing sessions. As previously noted, in the illustrated embodiment a minimum threshold value of 3 is used in selecting sequences that are frequent, and thus nodes whose associated counters have values that are less than 3 will be trimmed from the tree. FIG. 1H reflects the tree data structure after the nodes are trimmed, in which the four second-level nodes 144, 151, 152, and 135 remain.

After the nodes are trimmed, the FSD system uses the incremental determination technique to add a next group of candidate sequences. In particular, for each of the remaining nodes in the lowest level of the tree data structure (currently the remaining four second-level nodes 134), possible candidate sequences are considered based on adding each of the frequent singletons to the end of the sequences associated with the second-level nodes. However, now that frequent sequences of length 2 are known, this information can be used in eliminating from consideration candidate sequences that include subsequences of length 2 that are not among these frequent sequences. For example, for node 144 with the associated sequence <I-101,I-102>, children nodes having associated sequences <I-101,I-102,I-101>, <I-101,I-102, I-102>, <I-101,I-102,I-103>, and <I-101,I-102,I-104> will be considered. However, nodes 142, 151 and 152 indicate that while the sequences <I-102,I-102> and <I-102,I-103> are frequent sequences, sequences <I-102,I-101> and <I-102,I-104> are not. Thus, since candidate sequences <I-101,I-102,I-101> and <I-101,I-102,I-104> contain the non-frequent subsequences <I-102,I-101> or <I-102,I-104>, nodes representing these two candidate sequences do not have to be added to the tree data structure as candidate sequences. Furthermore, <I-101,I-102,I-103> cannot be a frequent sequence because its subsequence <I-101, I-103> is known to be a non-frequent sequence. Therefore, the node representing <I-101,I-102,I-103> does not need to be added, either. FIG. 11 reflects the tree data structure after 3 third-level nodes 135 with associated candidate sequences of length 3 are added, including the child node 156 of node 144.

Figure 1J:
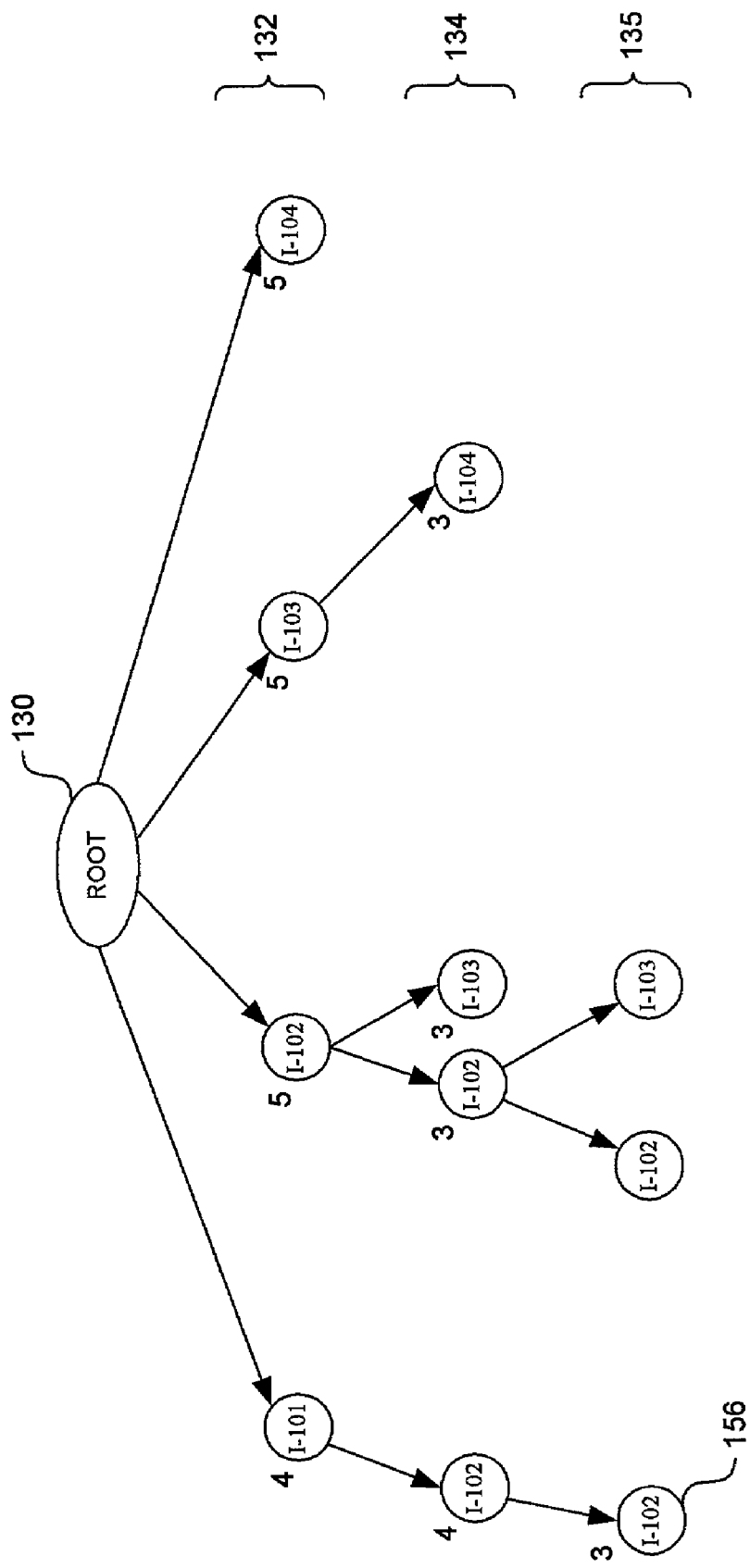
Figure 1K:
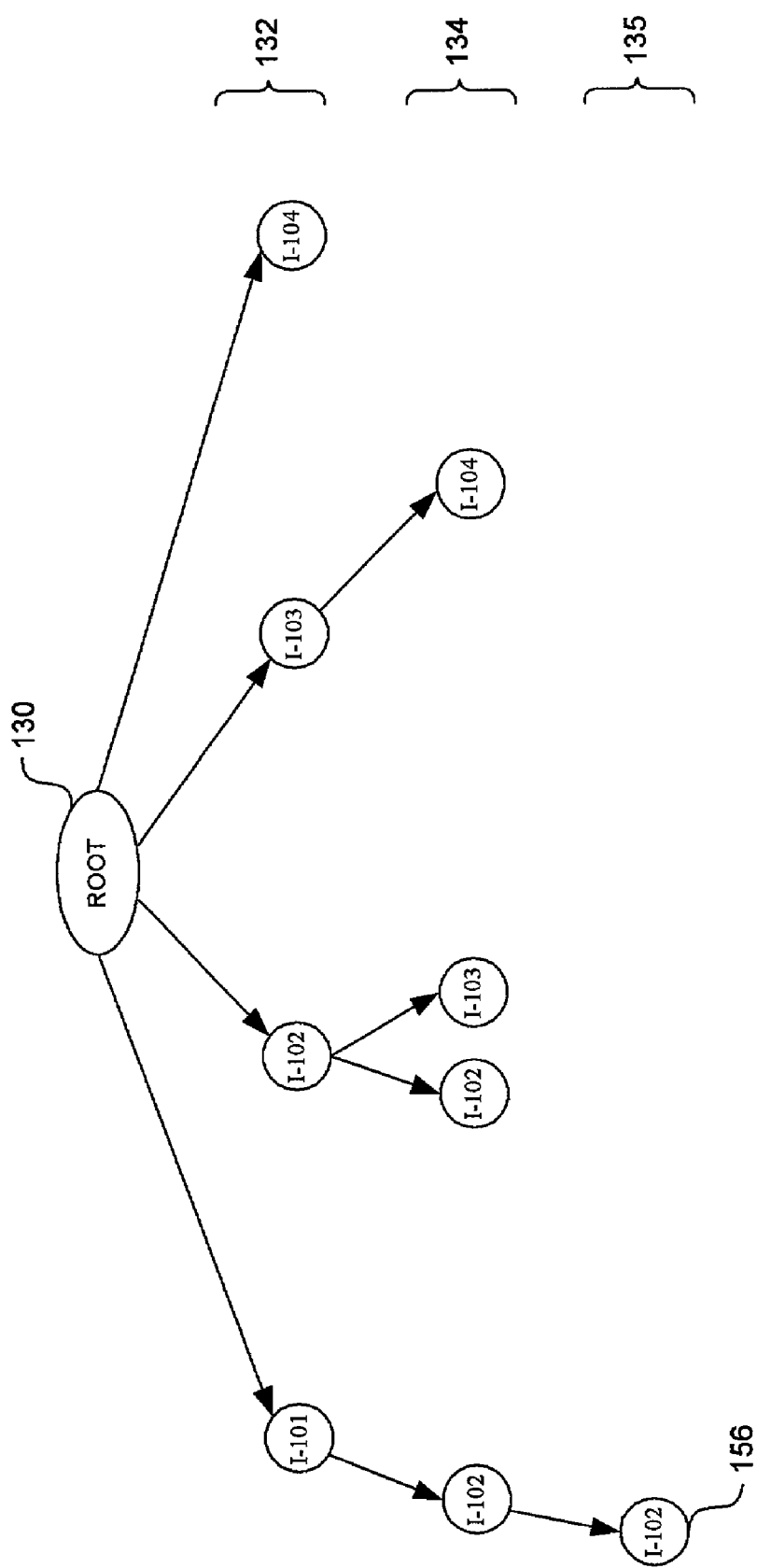

After the third-level nodes 135 are added to the tree, their associated candidate sequences are validated against the browsing sessions in a similar manner to that for the candidate sequences of length 2. FIG. 1J illustrates the values of the counters associated with the nodes after the candidate sequences are validated against each of the browsing sessions. Using the minimum threshold value of 3 for the illustrated embodiment, all of the third-level nodes other than node 156 will be trimmed from the tree. FIG. 1K reflects the tree data structure after the nodes are trimmed.

In the illustrated embodiment, less than 3 of the browsing sessions have more than three interaction events, and thus only sequences of length 3 or less can be frequent sequences in at least 3 of these browsing sessions. A maximum length of 3 could therefore be determined for these browsing sessions, with the incremental determination technique stopping without adding and validating a fourth level of nodes with associated candidate sequences of length 4. Alternately, no maximum length may be specified (or a predetermined maximum length of greater than 3 may be specified), and if so a fourth-level child node of node 156 (not shown) could be added representing the interaction event I-102 (with only this one node added for the same reason that only node 156 was added as a child node of node 144). After attempting to validate the candidate sequences added for this fourth-level node, the node will have an associated counter with a value below three and will thus be trimmed from the tree data structure. When all nodes with associated candidate sequences are trimmed, it can be determined that all possible frequent sequences are associated with the nodes remaining in the tree data structure. Thus, the sequences associated with the nine non-root nodes in groups 132, 134 and 135 illustrated in FIG. 1K are the frequent sequences that appear in at least three of the browsing sessions 1–7.

As indicated, as the interaction events are read from a session the occurrence of sequences within the session are tracked in some embodiments by associating a token with each node in the data structure when the sequence associated with the node is first detected in the session. In some embodiments, additional information could be associated with the tokens to provide additional capabilities. For example, each interaction event in a session could be assigned a consecutive number, and the number of the current interaction event could be stored instead of or in addition to the token. In this manner, the number of intervening interaction events between each two interaction events in a sequence could be determined, such as if each two interaction events in a sequence are restricted in some embodiments to be within a maximum separation or if a weighting is assigned to sequences based on the separation between the interaction events of the sequences in the browsing sessions in which the sequences are present. In a similar manner, other types of information (e.g., the time at which the interaction events occur in a browsing session) could be associated with the tokens for similar purposes. If such additional information is associated with a node at the time that the node's associated sequence first occurs in a session, such information can either be updated each time the sequence reoccurs in the session or could instead remain static depending on what information is desired to be obtained.

In addition, while tokens are used in some embodiments to track the occurrence of sequences within a session as the interaction events are read from the session, in other embodiments the sequences can be tracked in other manners. In particular, rather than tracking the nodes whose associated sequences have already occurred, in some embodiments the children nodes of such nodes are tracked. In the illustrative embodiment discussed with respect to FIGS. 1L–1N, a linked list data structure is created for each frequent singleton, with the entries of each linked list being the nodes whose parent nodes have sequences that have already occurred.

Figure 1L:
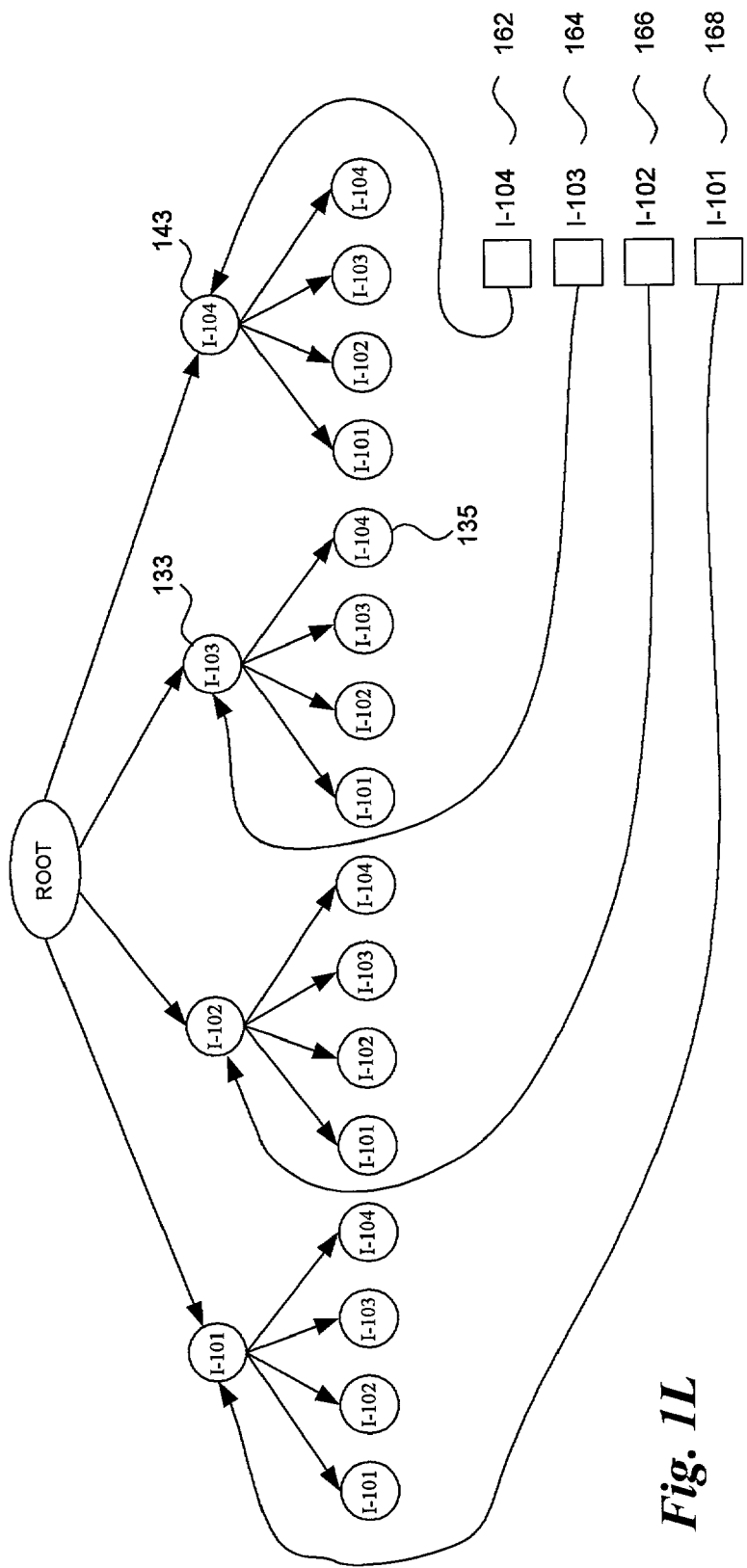

FIG. 1L illustrates the same tree data structure as that shown in FIG. 1D in which the 16 various candidate sequences of length 2 are represented by the second-level nodes and are to be validated against the user browsing sessions. Before validating each browsing session, each linked list data structure is initialized to have an entry for the first-level node that represents the interaction event associated with the linked list data structure. For example, linked list data structure 164 that is associated with interaction event I-103 in initialized to have an entry for first-level node 133 that represents I-103.

Figure 1M:
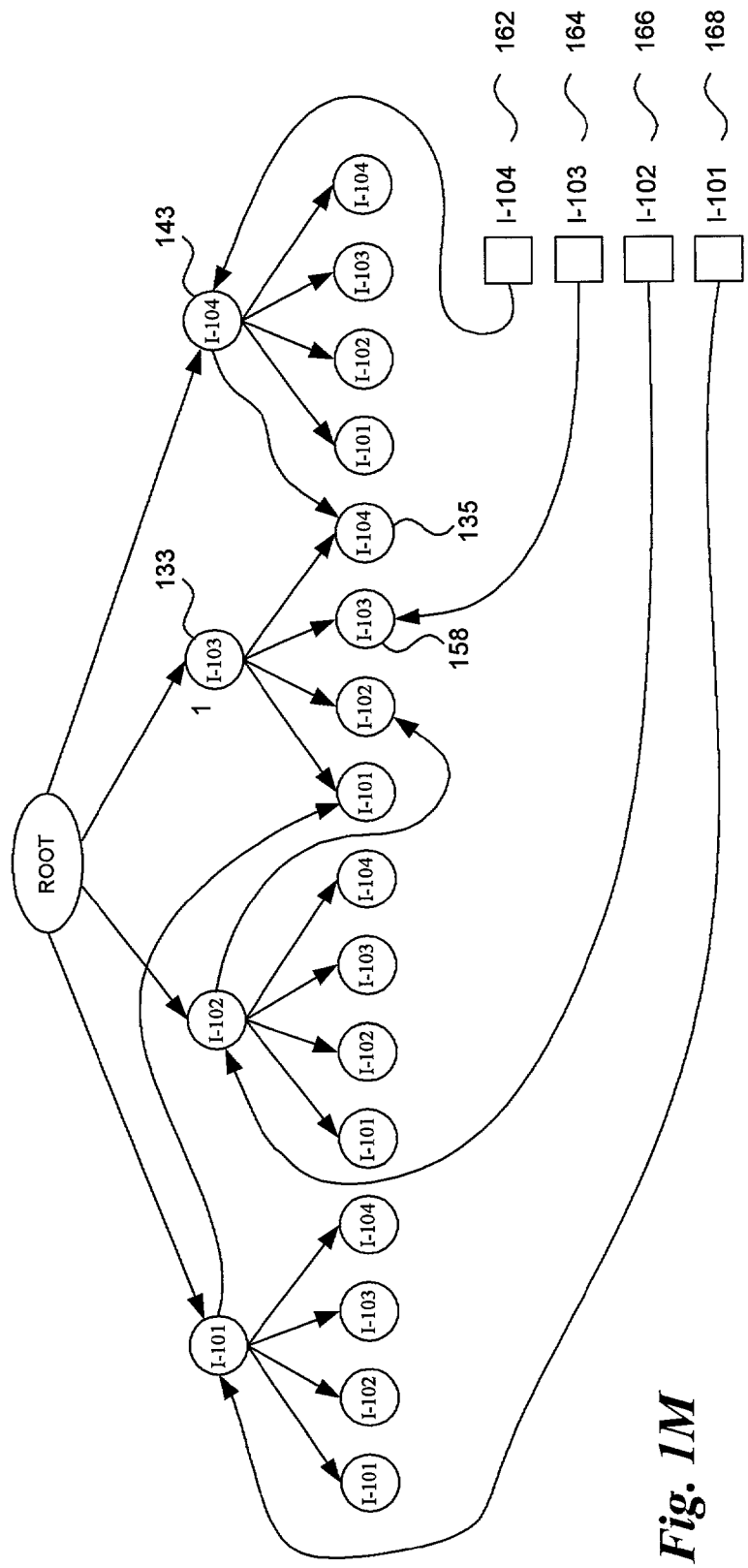

FIG. 1M illustrates the state of the data structures after the first interaction event I-103 is read from the first browsing session 1. In particular, when the interaction event is read, the linked list data structure for that interaction event is used to identify the nodes that have entries in the data structure and the counters associated with those nodes are incremented. Thus, the counter associated with node 133 has a value of 1 after the updating. In addition, the linked list data structures are updated to track the children of the nodes whose associated sequences have already occurred. In particular, the entries associated with the nodes whose values were just updated are removed from the linked list data structure associated with the interaction event that was just read since these nodes' counters are not to be updated again even if their associated sequences recur in the session. In addition, the children of each node whose counter was incremented have entries added to the linked list data structures associated with the interaction events that the nodes represent. For example, child node 158 that represents I-103 has an entry added to the linked list data structure 164 that is associated with interaction event I-103. Similarly, child node 135 that represents I-104 has an entry added to the linked list data structure 162 that is associated with interaction event I-104.

Figure 1N:
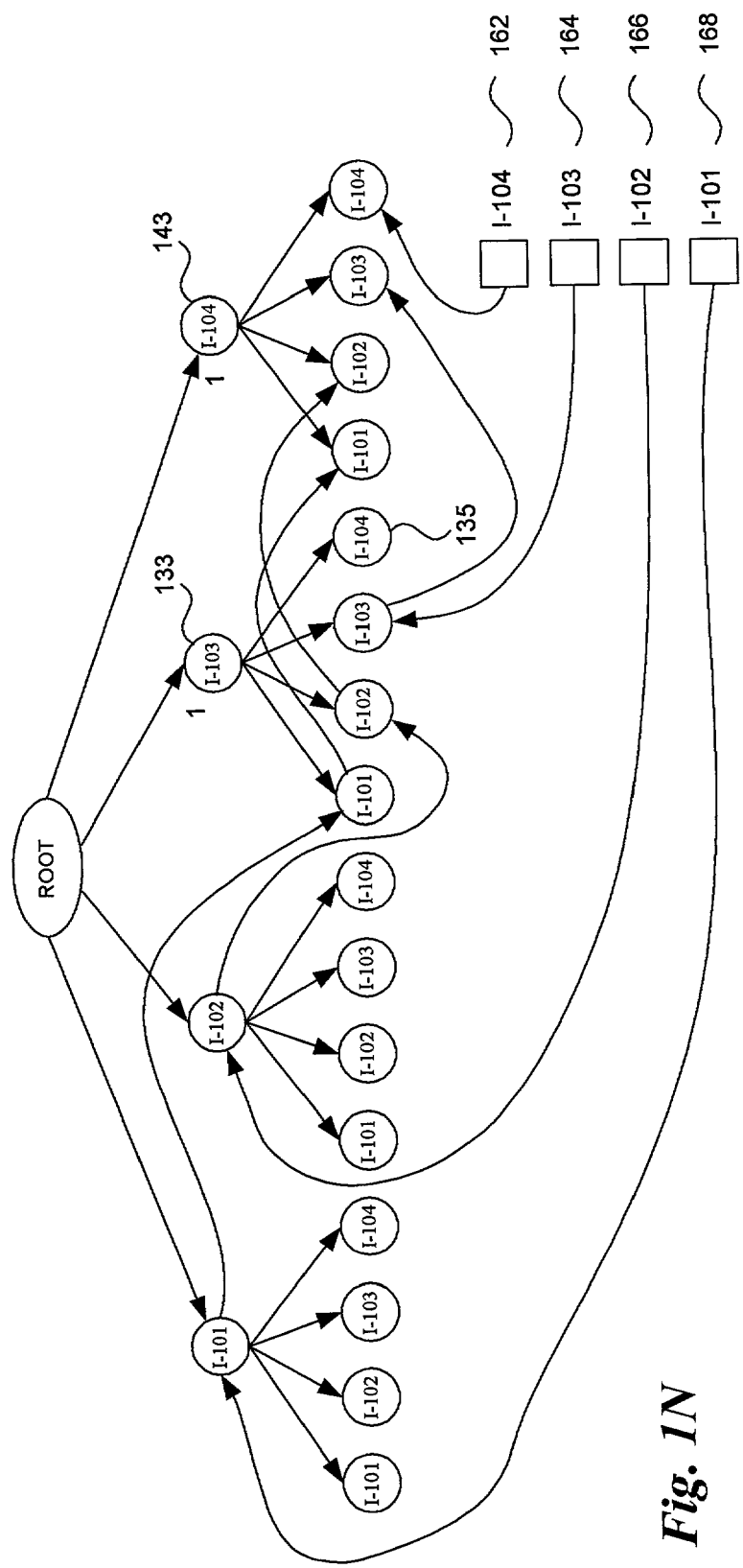

FIG. 1N illustrates the state of the data structures after the second interaction event I-104 is read from the first browsing session 1. In particular, the two nodes having entries in the linked list data structure 162 associated with interaction event I-104, those being nodes 143 and 135, have their counters updated and their entries removed from the linked list data structure. In addition, each of the children nodes of nodes 143 and 135 have entries added to the linked list data structures associated with the interaction events that the nodes represent. Thus, after the data structure is validated against both of the interaction events in browsing session 1, the nodes have the same associated counter values as were determined in FIG. 1E using the token-tracking technique. Those skilled in the art will appreciate that the children of the nodes whose associated sequences have already occurred could be tracked using data structures other than linked lists in other embodiments.

FIG. 1O illustrates example data structures that could be used for nodes in the tree data structure. In particular, data structures 185 and 190 represent the state of tree data structure nodes 143 and 148 respectively as shown in FIG. 1F (i.e., after the nodes have been validated against browsing session 1–5 and the first three interaction events of browsing session 6 have been read). Data structure 191 shows the updates to data structure 190 after the fourth interaction event of browsing session 6 is read. Each of the data structures has elements 171–181 indicating various information about the node being represented. For example, element 174 in each data structure holds the value of the counter associated with the node, element 176 indicates the interaction event represented by the node, and element 173 identifies the children nodes of the nodes. For embodiments in which token tracking is used, element 177 indicates whether the node currently has an associated token, and for elements in which linked list data structures are used, element 178 can contain an indicator of the next node data structure in a list.

Elements 179–181 provide examples of how various other types of information about the sequences could additionally be tracked. For example, if the number of unique users that have performed a sequence is to be determined (either instead of or in addition to the number of browsing sessions in which the sequence occurred), such information can be tracked and stored in element 179. Similarly, if information about how closely associated the interaction events in a sequence are, such as the total number of elements that intervene between the elements of the sequences in the browsing sessions or the cumulative time that accrues between the occurrence of the interaction events in the browsing sessions, such information can be tracked in elements 180 and 181. Those skilled in the art will appreciate that to track information such as intervening time, the FSD system would need to have access to the time of occurrence information for the interaction events in the groups. Thus, information beyond that illustrated with respect to FIG. 1B could be provided to the system, such as the information illustrated in FIG. 1S. Those skilled in the art will also appreciate that a variety of other types of information could similarly be stored, and that various other types of data structures could be used for the data structures.

Figure 1Q:
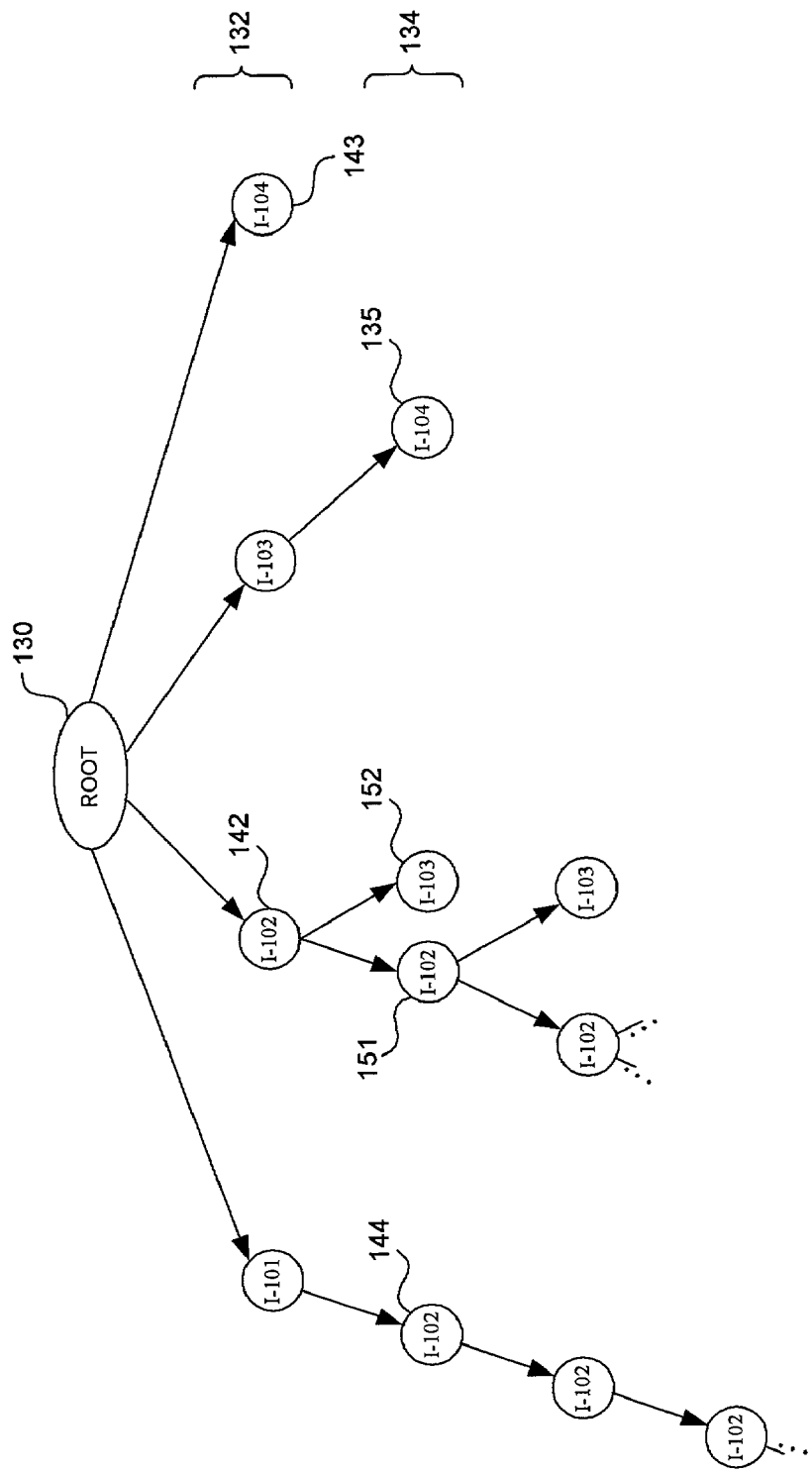
Figure 1R:
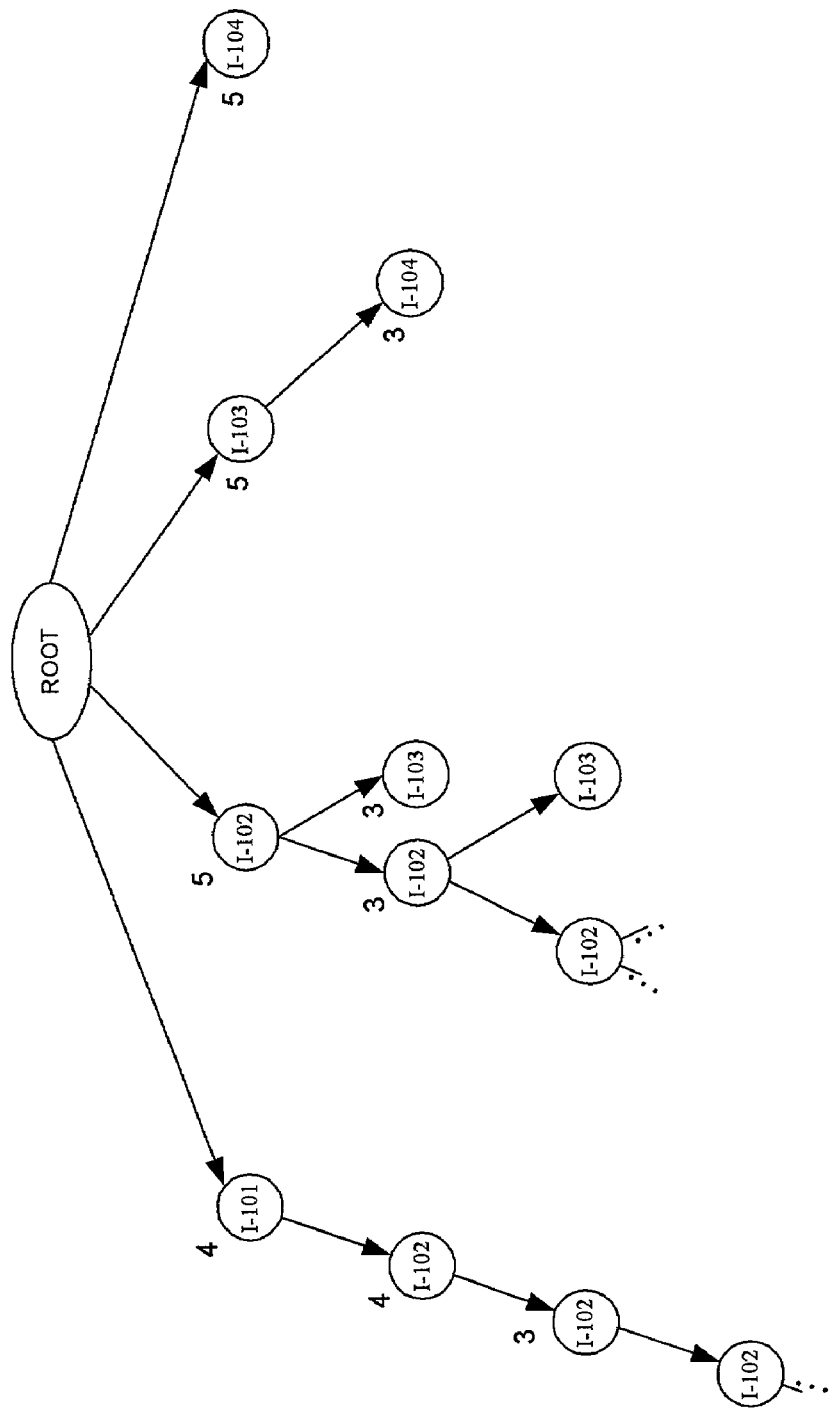

FIGS. 1P–1R illustrate techniques for, rather than incrementally determining the frequent sequences, instead validating candidate sequences of varying lengths at the same time by analyzing each group of interaction events once in a single pass to determine each of the possible sequences that are present in that group. In the illustrated embodiment, the frequent singletons of the interaction event groups are determined in a first pass of the interaction event groups, and then the frequent sequences of a short length (e.g., 2) are determined in a second pass of the groups. The information about the frequent singletons and the frequent sequences of the short length are then used to construct the various candidate sequences of lengths greater than the short length. Those skilled in the art will appreciate that in other embodiments frequent sequences of other lengths could instead be determined, or instead a measure of the frequent combinations of two of the interaction events (in which order is not important) could be used since it is a superset of the frequent sequences and thus would identify each frequent sequence.

FIG. 1P illustrates a matrix indicating the number of sessions in which each frequent sequence of length 2 occurs.

For example, element 192 of the matrix indicates that the sequence <I-104,I-102> occurs in 1 of the browsing sessions, while element 193 indicates that the sequence <I-102, I-104> occurs in 2 of the browsing sessions. If a threshold of 3 browsing sessions is again used, the frequent sequences of length 2 are identified from the matrix as being <I-101, I-102>, <I-102,I-102>, <I-102,I-103>, and <I-103,I-104>. The information from the matrix and from the frequent singletons can then be used to construct a data structure representing all candidate sequences, such as the tree data structure illustrated in FIG. 1Q. As would be expected, the first-level group of nodes 132 and the second-level group of nodes 134 in the tree that represent the sequences already determined to be frequent are the same as were previously determined using the incremental method as illustrated in FIG. 1H.

After creating the first two levels of nodes in the tree data structure illustrated in FIG. 1Q, the remainder of the data structure is formed by successively adding additional levels to the tree. This is done by, for each node at the current lowest level of the tree, adding children nodes representing each frequent singleton unless the sequence associated with a child node includes a subsequence of the shorter length (in this example 2) that was not frequent. Thus, for example, no nodes are added to second-level node 135 representing interaction event I-104 since there are no frequent sequences of length 2 that begin with that interaction event. Conversely, a node representing interaction event I-102 is added to second-level node 144 that also represents interaction event I-102 since the matrix indicates that sequences <I-102, I-102>, <I-101,I-102> are both frequent. The levels of the tree continue to be grown in this manner until no more candidate sequences can be added or until a maximum sequence length is reached.

If a loop is present in the frequent subsequences (e.g., since the sequence <I-102,I-102> is frequent, child nodes representing interaction event I-102 can continue to be added to other nodes representing I-102 indefinitely), the tree will grow indefinitely until the loop is terminated either by a maximum sequence length or by some other termination method (e.g., allowing no loops or a maximum number of loop occurrences). The repetition indicators " . . . " in the tree below two of the nodes representing I-102 indicate that they will both continue to have children nodes representing I-102 that are added until the loop is terminated. Each node representing I-102 that is added below node 151 will also have a child node representing I-103.

After the tree indicating all of the candidate sequences is constructed, it is validated against the groups of interaction events in a single pass. FIG. 1R illustrates the values of the counters associated with the nodes after the validation is completed. As would be expected, the same nine non-root nodes that were identified in FIG. 1K using the incremental technique are again identified as occurring in at least three sessions, and thus being the frequent sequences. The tree data structure shown in FIG. 1R can be validated against the interaction event groups in a variety of ways, including using the token tracking and linked list data structure tracking techniques described previously.

As previously indicated, each interaction event can have a variety of types of associated information. For example, the interaction events are shown in order of their occurrence in FIG. 1S, with each interaction event having an associated time of occurrence 197, an associated event category 198, and an associated price 199. The category and price information could apply to a situation in which each interaction event represented not only a Web page having being served to a user, but the Web page representing a product that is being sold from the Website which was subsequently purchased by the user by using the served Web page. Thus, the price information could represent the price of the product purchased (either as a specific price, or as one of groups of prices such as High and Low), and the category information could indicate the type of the product (e.g., book or CD). Those skilled in the art will appreciate that a variety of other types of information could similarly be associated with interaction events.

The described techniques can be used to determine a variety of types of information other than merely frequent sequences of interaction events in user browsing sessions. For example, an owner of a Website providing information about products or selling products may have multiple Web pages in each of various product categories, and may be interested in determining the frequent sequences of interaction event categories that occur. If so, the same techniques previously described could be used by substituting the category information instead of the interaction event identifier as information is read from each browsing session. Thus, for example, browsing session 1 would be treated as consisting of interaction event Book followed by interaction event Clothes. The interaction event categories would be used to determine frequent category singletons, and that information could then be used with either the incremental or single-pass techniques.

Figure 1T:
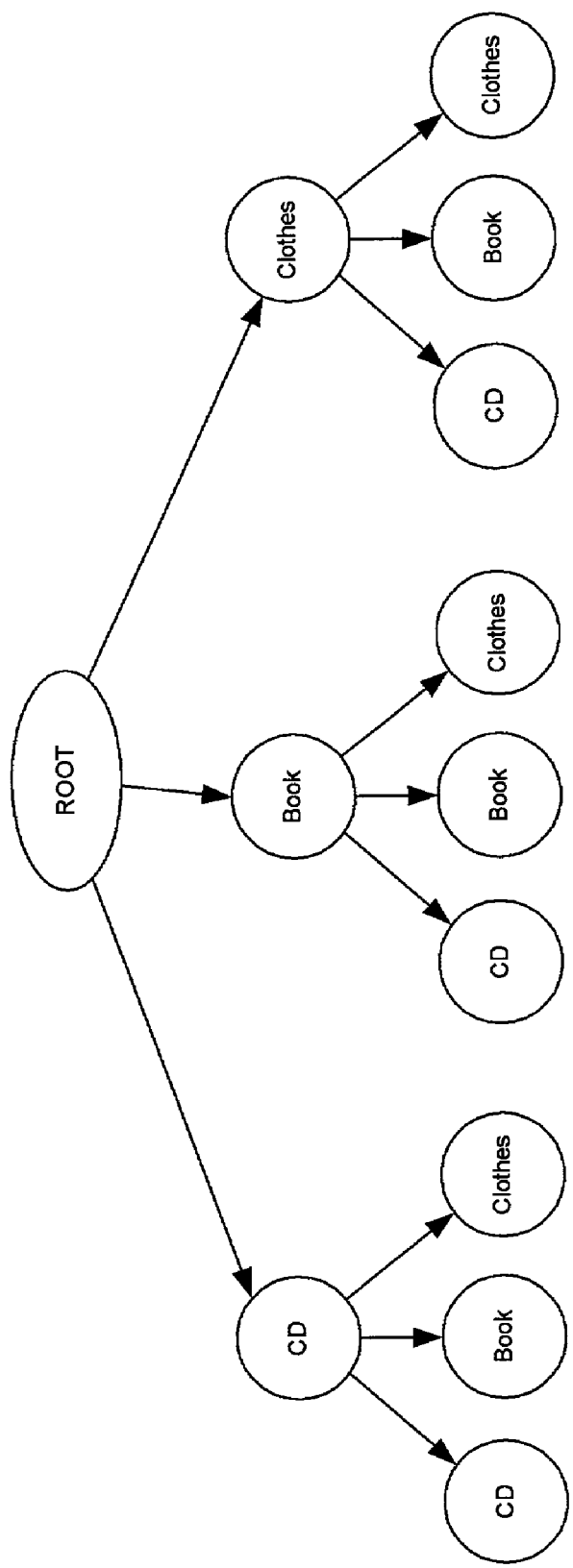
Figure 1U:
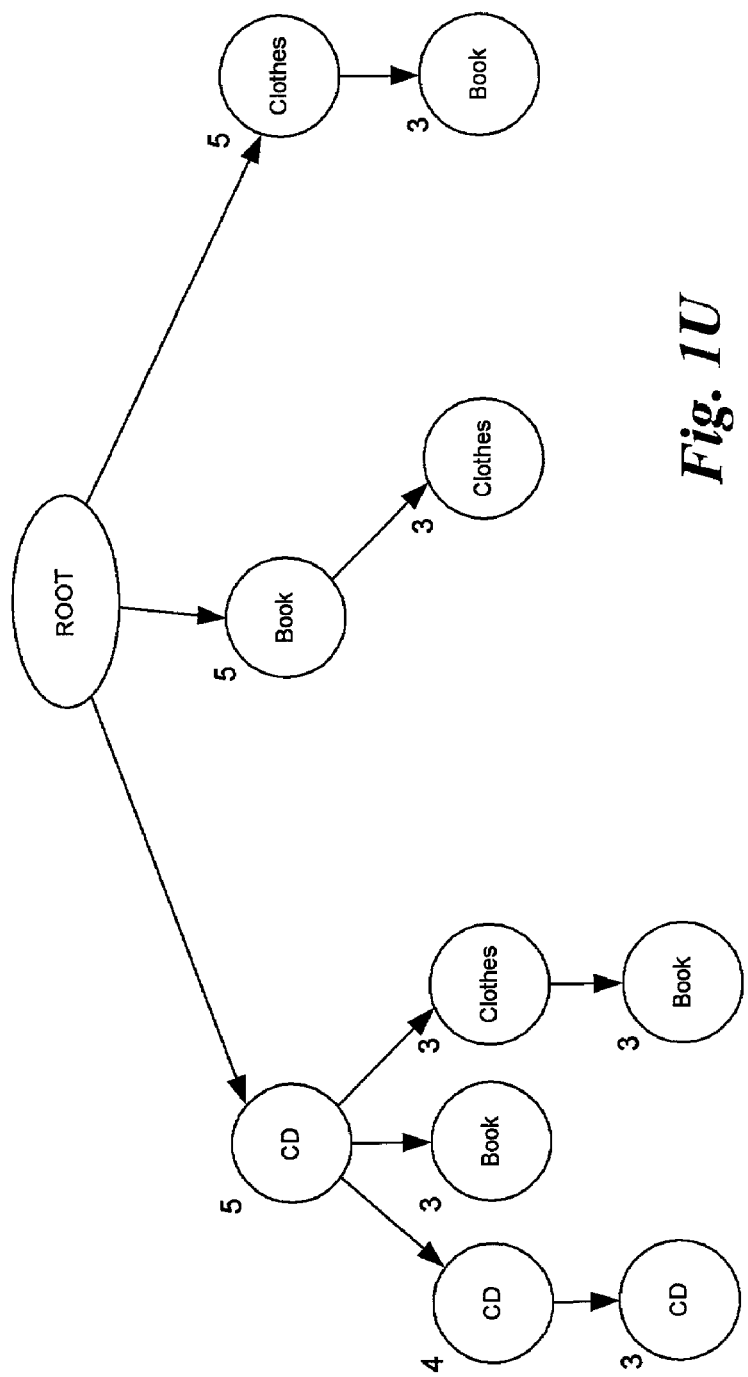
Figure 1V:
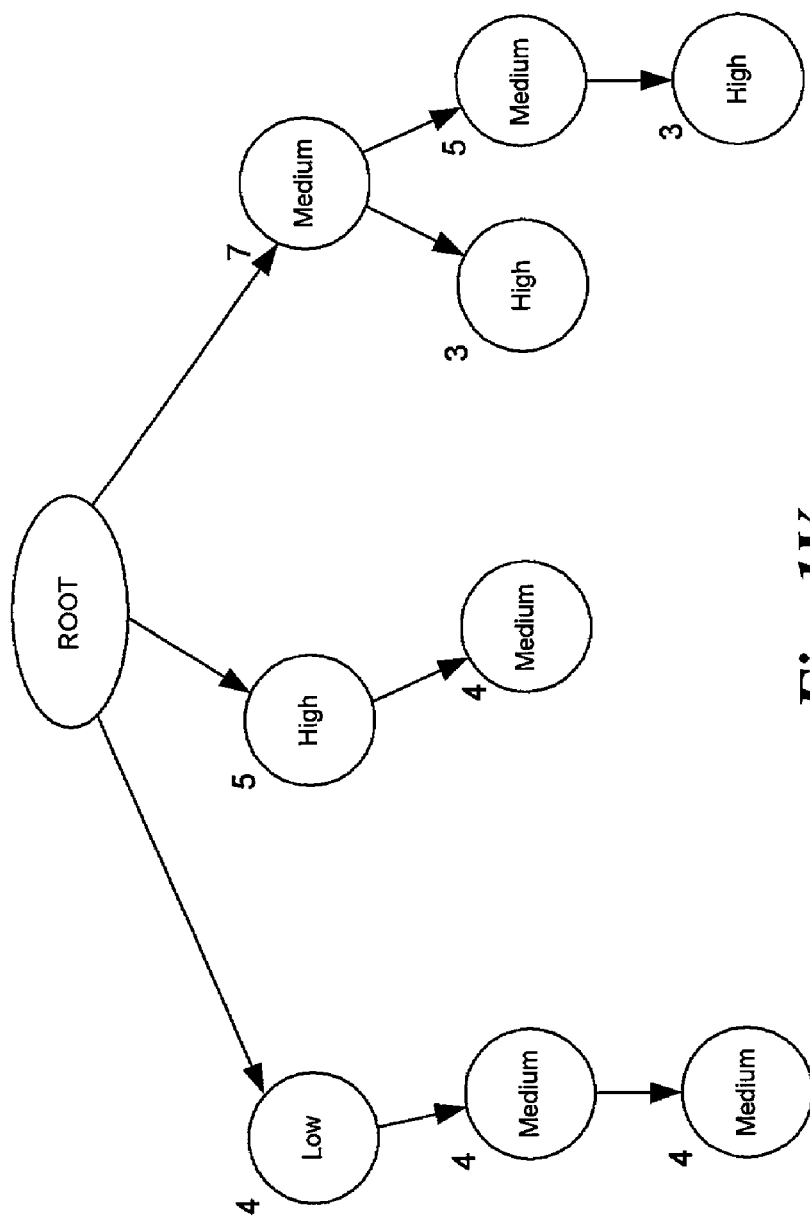

FIG. 1T illustrates a tree data structure for identifying frequent sequences of interaction event categories of length 2 using the incremental technique, and FIG. 1U illustrates the complete tree after it has been repeatedly grown and validated against the browsing sessions. For example, the sequence <Clothes,Book> was found in three of the browsing sessions (based on interaction events I-104 and I-106 in session 2 and on interaction events I-104 and I-103 in sessions 6 and 7). In a similar manner, frequent sequences of interaction event prices could be determined as is illustrated in FIG. 1V. For example, the frequent sequence of prices <Low,Medium,Medium> was found in four of the browsing sessions (based on the interaction events I-101, I-102 and I-102 in sessions 3 and 4, on interaction events I-101, I-104 and I-102 in session 6, and on interaction events I-101, I-102 and I-104 in session 2).

Figure 1W:
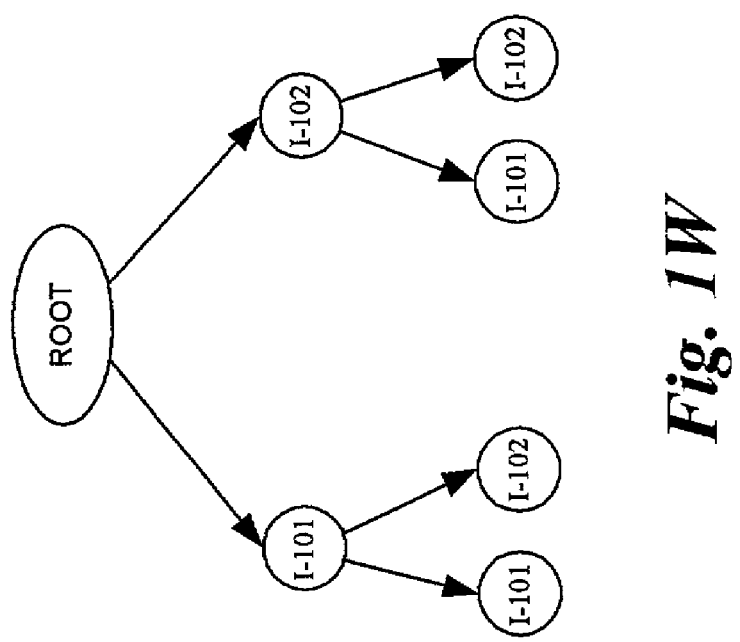
Figure 1X:
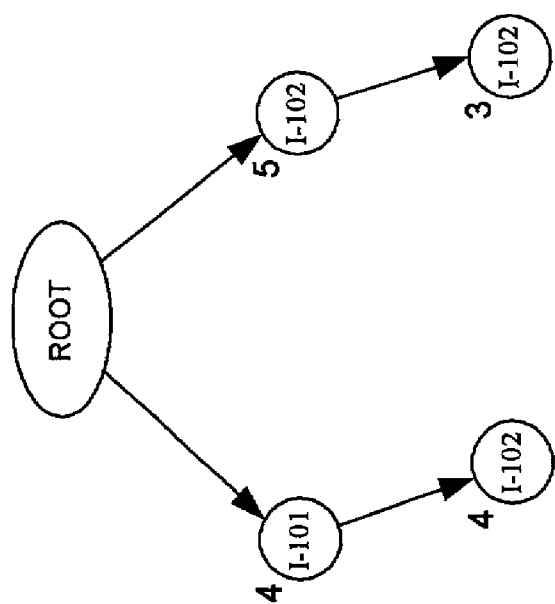

In addition to identifying frequent sequences in the user browsing sessions, frequent sequences in groups of related interaction events other than browsing sessions can also be determined. For example, it may be of interest to determine frequent sequences of interaction events within a category, such as sequences of different CD interaction events within the CD category. If so, only interaction events of that category in the browsing sessions would be considered. For example, browsing session 6 having interaction events I-101, I-104, I-102, I-103, I-102, and I-105 would be treated for the purposes of the frequent sequence determination as having only interaction events I-101, I-102, and I-102. FIG. 1W illustrates a tree data structure having second-level candidate sequences for interaction events within the CD category that are to be validated using the incremental technique, and FIG. 1X illustrates the completed tree data structure identifying the frequent sequences of interaction events within the CD category. For example, the sequence of interaction events <I-102,I-102> is present in each of sessions 3, 4 and 6.

Figure 1Y:
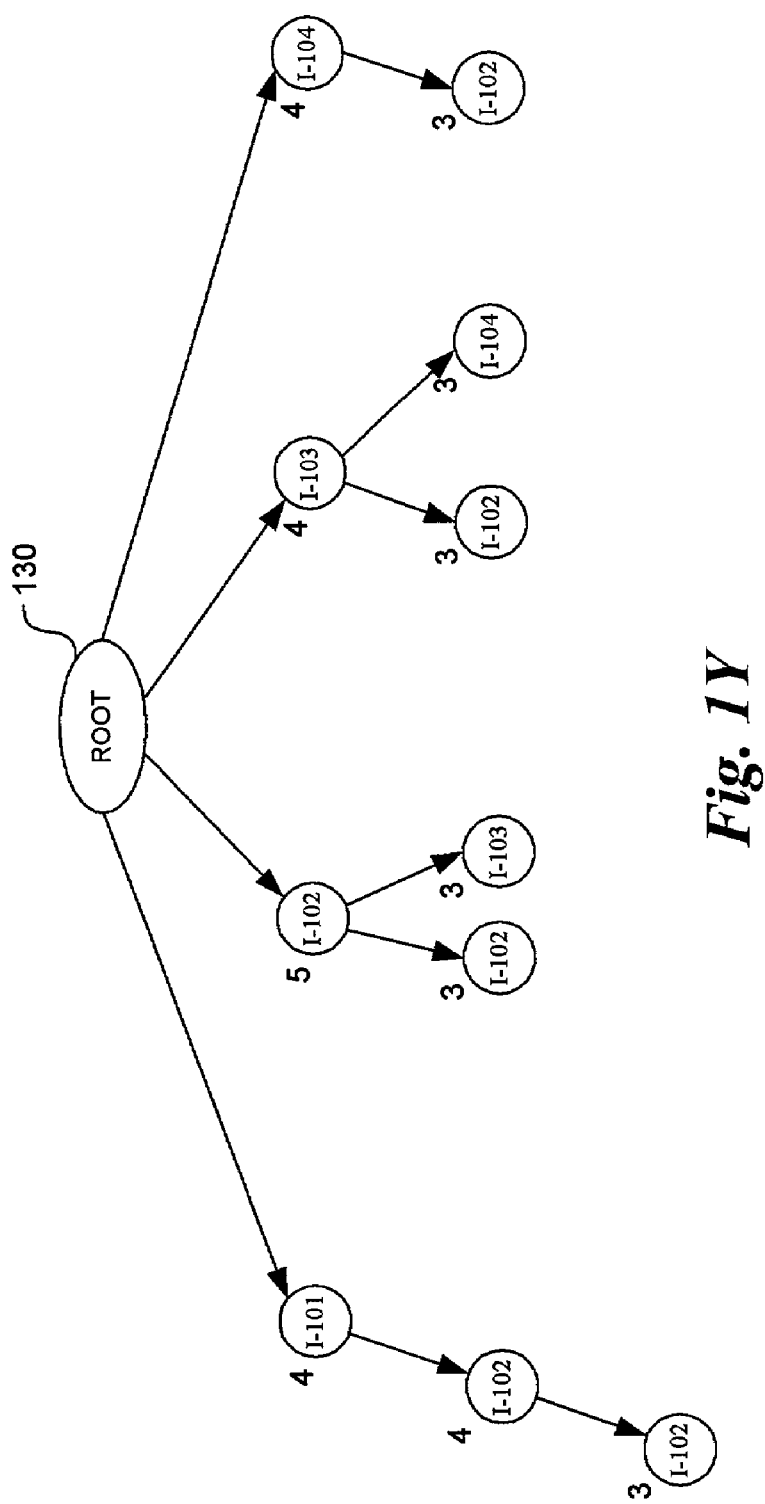
Figure 1Z:
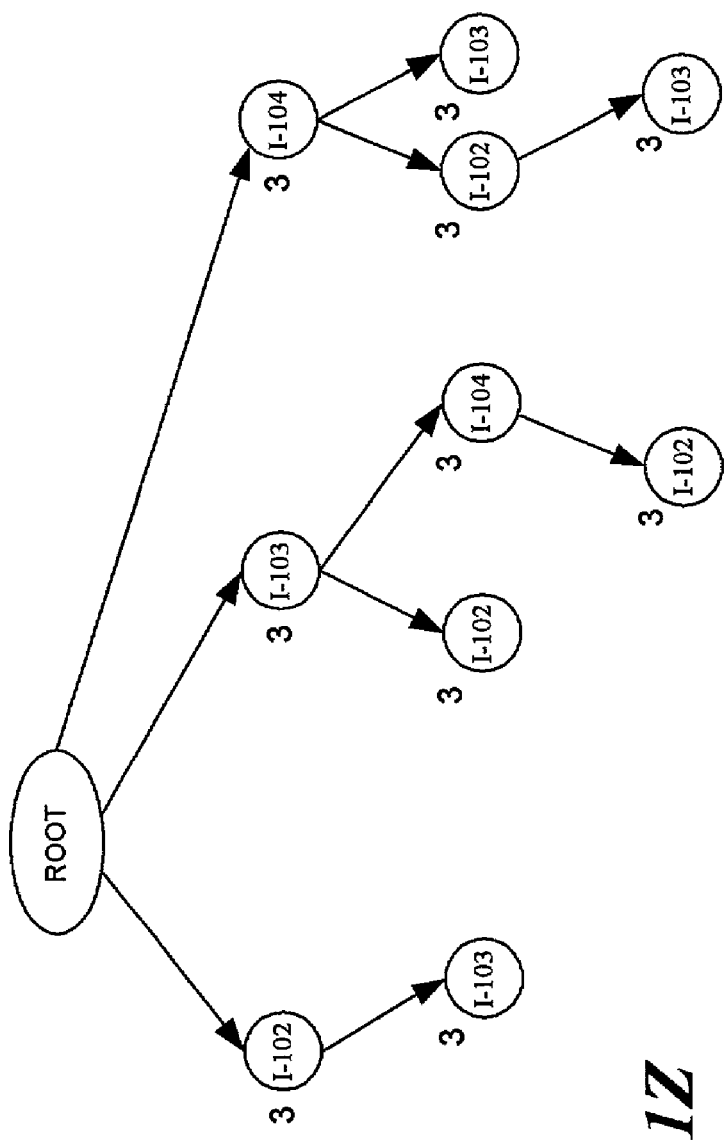

Alternately, rather than considering each browsing session of a user distinctly, frequent sequences could be determined using all of a user's interaction events as a single group. If so, and if only the first occurrence of a sequence is counted, the resulting frequent sequences are illustrated in FIG. 1Y. For example, the frequent sequence <I-103,I-102> was found in browsing sessions 2 and 6 for Users 5 and 4 respectively and in the combination of browsing sessions 1 and 3 for User 1. Yet another alternative is to analyze frequent sequences of interaction events in manners unrelated to the user or browsing session in which the interaction event occurred. For example, interaction events could be grouped based on periods of time in which they occurred. In FIG. 1S, visual indicators 194 separate the interaction events into 4 groups based on periods of time of 6 time units each (e.g., each unit of time could be 10 seconds or 10 minutes), and FIG. 1Z indicates the frequent sequences of interaction events that occur in at least 3 of the periods of time. Those skilled in the art will appreciate that other types of frequent sequences of interaction events can be determined in a similar manner, and that in some embodiments multiple occurrences of a sequence of in an interaction event group could be counted.

Figure 2:
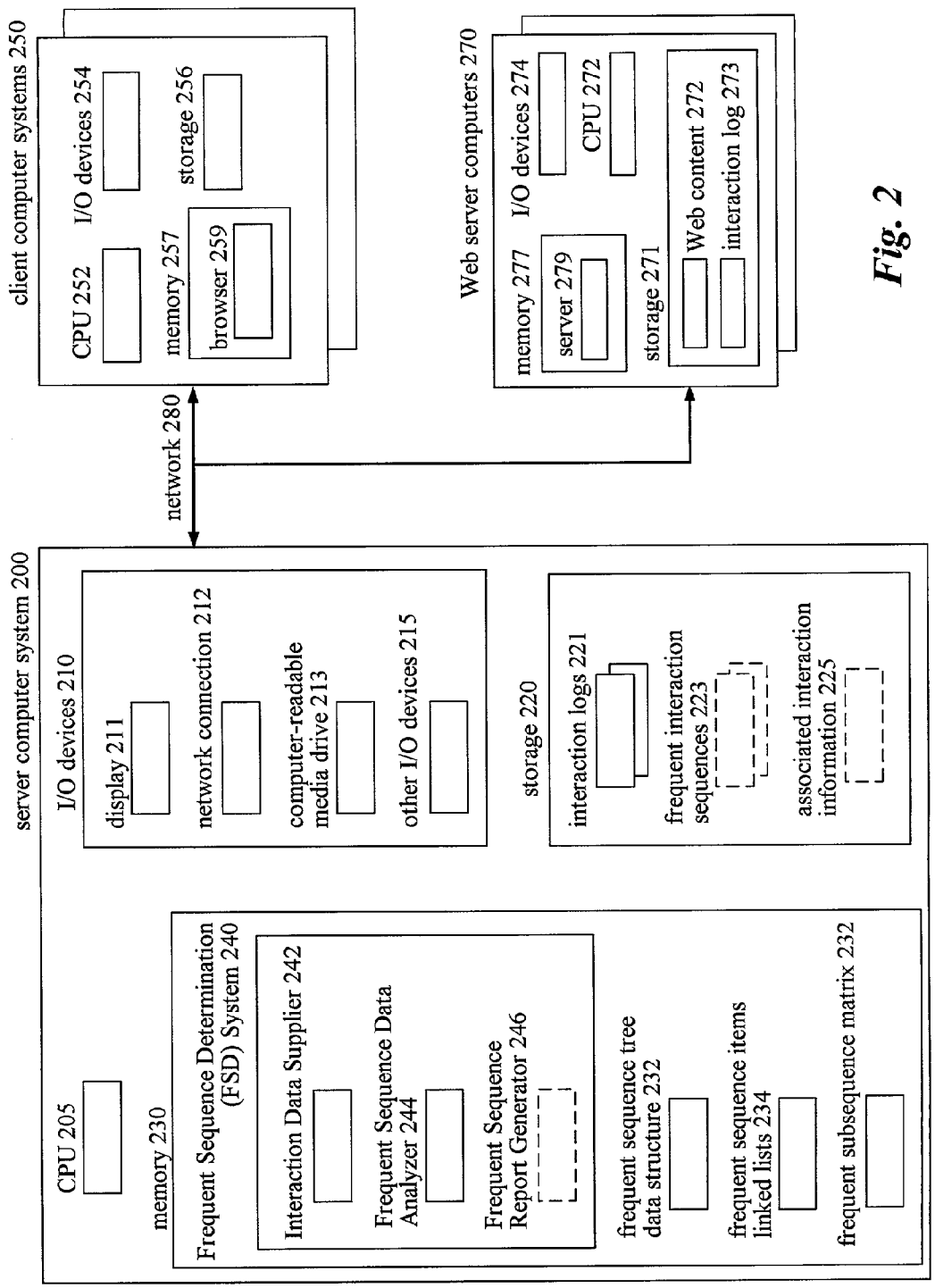
FIG. 2 is a block diagram illustrating an embodiment of the disclosed Frequent Sequence Determination system.

FIG. 2 illustrates a server computer system 200 suitable for executing an embodiment of the Frequent Sequence Determination (FSD) system, as well as client computer systems 250 from which users can retrieve and display Web content from Web server computers 270. The FSD system in the illustrated embodiment obtains information from one or more of the Web server computers that reflects usage of the Websites provided by those Web servers, identifies frequent sequences of the interaction events in the usage data, and makes information about the frequent sequences available to representatives associated with the Websites.

The server computer system 200 includes a CPU 205, various I/O devices 210, storage 220, and memory 230. The I/O devices include a display 211, a network connection 212, a computer-readable media drive 213, and other I/O devices 215. An embodiment of the FSD system 240 is executing in memory, and it includes an Interaction Data Supplier component 242 and a Frequent Sequence Data Analyzer component 244, as well as optionally including a Frequent Sequence Report Generator component 246. Users can access the FSD system in a variety of ways. For example, some users may have physical access to the server computer system, while other users can use the client computer systems to remotely access the system (e.g., via the Internet and/or the World Wide Web). A remote user on a client system can use software or other provided functionality, such as a browser 259 executing in memory 257, to interact with the FSD system. In addition, some or all of the FSD system components may provide information to users (e.g., in response to user requests) such as generated reports about identified frequent sequences, and this information can be presented to the users on the display 211 of the server system or on one of the I/O devices 254 on a client system.

The Web server computers have stored Web content 272 that is provided to users of client computer systems upon request, and the Web servers maintain a stored interaction log 273 that includes information about some or all of the interaction events between users or other computers and the Web server. For example, the interaction logs may contain usage data about page views provided to users and about transactions (e.g., purchases of items) performed with users. If the FSD system is to identify frequent sequences in an interaction log, information from the interaction log is supplied to the FSD system. In particular, in some embodiments the FSD system retrieves a copy of the stored interaction log from a Web server (e.g., periodically or upon receiving an instruction to do so) and stores it as an interaction log 221 on local storage. In other embodiments, software executing on the Web server computer (not shown) could send the stored interaction log to the FSD system when appropriate, or could instead extract the relevant groups of interaction events and send only that information to the FSD system.

When the FSD system is to identify the frequent sequences in groups of related interaction events, the Interaction Data Supplier component retrieves the information and provides it to the Frequent Sequence Data Analyzer component in the appropriate format. For example, if one of the interaction logs 221 is to be analyzed, the Interaction Data Supplier component can determine the distinct browsing sessions in the log, sort the interaction events in the browsing sessions by user and session, and then provide the sorted interaction events to the Frequent Sequence Data Analyzer component.

After the Frequent Sequence Data Analyzer component receives the data to be analyzed, the component can use one or more of the analysis techniques previously discussed to identify frequent sequences in the data. During the analysis, the component may create and use various data structures in memory, such as a frequent sequence tree data structure 232, linked list data structures for frequent singletons 234, and/or a frequent subsequence matrix 232. After frequent sequences are identified, the component may optionally store the sequences as one of the groups of frequent interaction sequences 223 on local storage. If so, the stored information can be later provided to appropriate users, either directly or as part of a generated report.

If a Frequent Sequence Report Generator component is present, the component can receive information about identified frequent sequences either directly from the Frequent Sequence Data Analyzer component or instead from stored copies of frequent interaction sequences. The Frequent Sequence Report Generator component can then generate reports related to the frequent sequences and provide the reports to appropriate users. In some embodiments remote users can interactively specify types of reports to be provided, and the component can generate Web pages that include the specified reports and provide the Web pages to the users.

In some embodiments, the various components of the FSD system may also use optional information 225 that is associated with the interaction events. For example, if sequences are to be determined or reported based on attributes of the interaction events (e.g., categories of the events or other event attributes), the FSD system may receive that attribute information directly as part of the interaction log or the information extracted from the log. Alternately, the log or extracted information may only identify the interaction events (e.g., indicators of various Web pages), and the FSD system could use separate information associated with that Website to determine the attribute information associated with the interaction event (e.g., an associated category based on the product displayed on the Web page). Such separate associated information could either be received along with copies of the interaction logs, or could instead be retrieved and stored prior to the first analysis of the log.

Those skilled in the art will appreciate that computer systems 200, 250, and 270 are merely illustrative and are not intended to limit the scope of the present invention. For example, computer system 200 may be connected to other devices that are not illustrated, including through one or more networks such as the Internet or via the World Wide Web (WWW). In addition, the functionality provided by the illustrated FSD system components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory while being used, these items or portions of them can be transferred between memory and other storage devices for purposes of memory management and data integrity. Similarly, items illustrated as being present on storage while being used can instead be transferred between storage and memory. Some or all of the components or data structures of the FSD system may also be stored (e.g., as instructions or structured data) on a computer-readable medium, such as a hard disk, a memory, a network, or a portable article to be read by an appropriate drive. The FSD system components and data structures can also be transmitted as generated data signals (e.g., as part of a carrier wave) on a variety of computer-readable transmission mediums, including wireless-based and wired/cable-based mediums. Accordingly, the present invention may be practiced with other computer system configurations.

In the illustrated embodiment, systems interact over the Internet by sending HTTP messages and exchanging Web pages. Those skilled in the art will appreciate, however, that the techniques of the FSD system can be used in various environments other than the Internet. In addition, a "client" or "server" may comprise any combination of hardware or software that can interact (and for which interactions can be generated or received), including computers, network devices, internet appliances, PDAs, wireless phones, pagers, electronic organizers, television-based systems and various other consumer products that include inter-communication capabilities. Communication protocols other than HTTP can also be used, such as WAP, TCP/IP, or FTP. Both the client and server systems can also operate on a wide variety of operating system types (e.g., Windows, Linux, Unix, MacOS, BEOS, PalmOS, EPOC, Windows CE, FLEXOS, OS/9, JavaOS, etc.), and need not share the same operating system.

Figure 3:
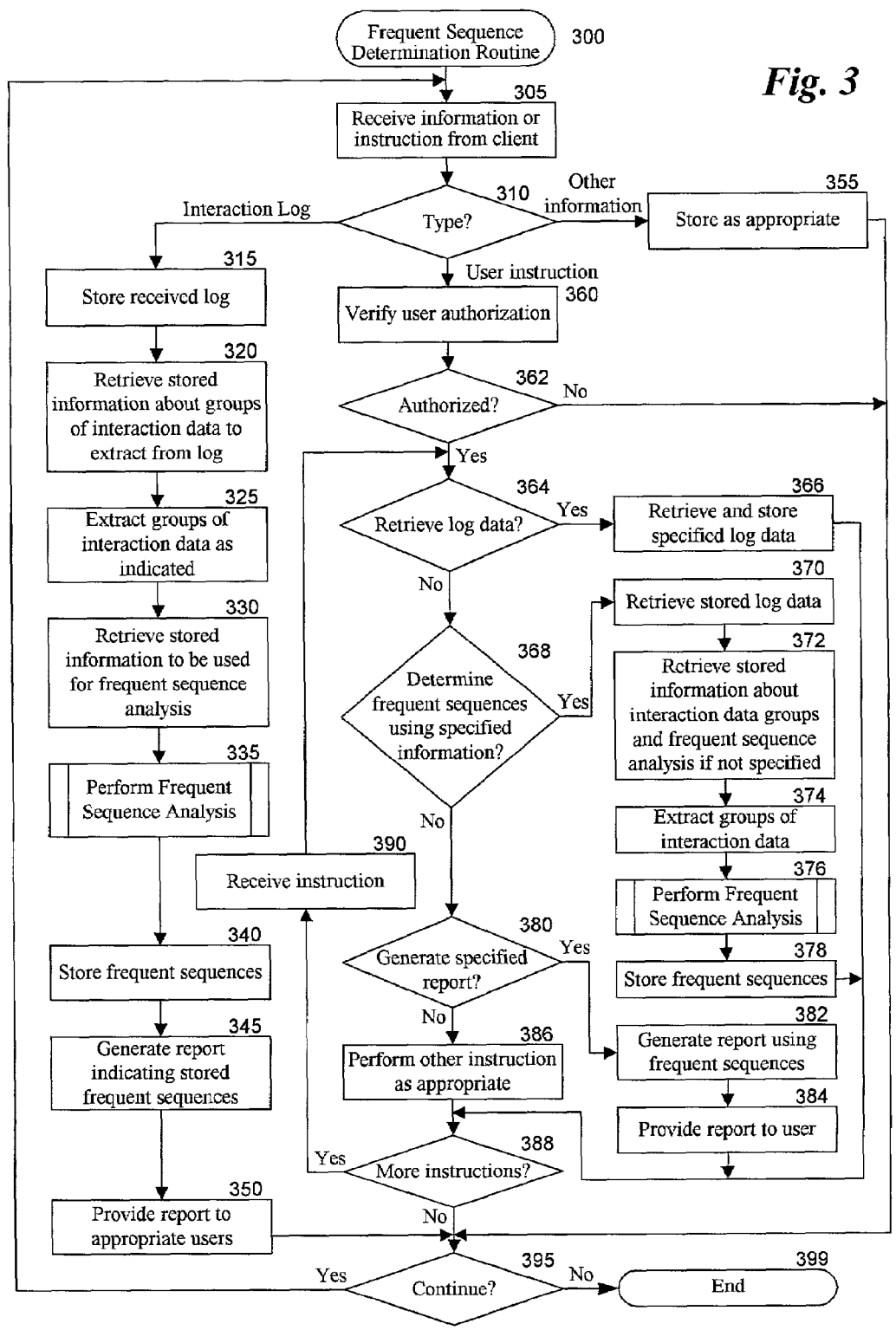
FIG. 3 is a flow diagram of an embodiment of the Frequent Sequence Determination routine.

FIG. 3 is a flow diagram of an embodiment of the Frequent Sequence Determination routine 300. The routine receives interaction event information to be analyzed or instructions from users, and processes the information or instructions as appropriate. The routine begins at step 305 where information or an instruction is received. The routine then continues to step 310 to determine the type of information or instruction that is received.

If an interaction log is received, the routine continues to step 315 where it stores the received log. At step 320, the routine next retrieves stored information (e.g., default information or previously specified customer-specific information) about the types of groups of interaction event data that are to be extracted from the log (e.g., all interaction events in each user session). In step 325, the routine then extracts the groups of interaction event data from the received log as indicated. At step 330, the routine next retrieves stored information (e.g., default or customer-specific information) that specifies how the frequent sequence analysis is to be performed (e.g., a type of threshold to be used when determining whether a sequence is frequent). The routine then continues to step 335 where it executes the Perform Frequent Sequence Analysis subroutine to identify the frequent sequences. In step 340, the routine then stores the frequent sequences that are identified, and next continues to step 345 to generate a report indicating the identified frequent sequences. The routine then continues to step 350 to provide the report to one or more appropriate users.

If it was instead determined in step 310 that information other than an interaction log is received, the routine continues to step 355 to store the information as appropriate. For example, information that is associated with interaction events from a particular customer may be received so that relevant attributes of the interaction events can be later identified. If so, this information would be stored in a manner accessible to the Perform Frequent Sequence Analysis subroutine. In addition, while extracted groups of interaction event data are not received in the illustrated embodiment, if such information was received the routine could store the information and then continue to step 330 to begin to perform the frequent sequence analysis on the extracted data.

If it was instead determined in step 310 that a user instruction was received, the routine continues to step 360 to verify that the user has authorization to provide instructions. If it is determined in step 362 that the user is authorized (e.g., based on a login name and password), the routine continues to step 364. In the illustrated embodiment, a user can interactively send multiple related instructions, such as first specifying log data of interest to be analyzed, next specifying a particular type of frequent sequence to be identified, and then having a report generated based on the identified frequent sequences. In step 364, the routine determines if the user instruction is to retrieve log data from a site of a customer for which the user is a representative. If so, the routine continues to step 366 to retrieve and store the specified log data. In some embodiments, the routine could automatically begin processing such log data beginning with step 320 after it is received.

If it was instead determined in step 364 that the instruction was not to retrieve log data, the routine continues to step 368 to determine if the instruction is to identify frequent sequences using specified information. If so, the routine continues to step 370 to retrieve previously stored log data (e.g., log data previously stored in step 366). The routine then continues to step 372 to retrieve, if such information is not specified along with the instruction, stored information about the types of interaction event data groups to be extracted from the log data and the types of frequent sequence analysis to be performed. The routine next continues to step 374 to extract groups of interaction data from the log data, and then continues to step 376 to execute the Perform Frequent Sequence Analysis subroutine. After step 376, the routine continues to step 378 to store the identified frequent sequences.

If it was instead determined in step 368 that the user instruction was not to identify frequent sequences, the routine continues to step 380 to determine if the instruction is to generate a specified report. If so, the routine continues to step 382 to generate a report as specified using stored information about identified frequent sequences (e.g., information stored in step 378). The routine then continues to step 384 to provide the report to the user. If it was instead determined in step 380 that the instruction was not to generate a specified report, the routine continues instead to step 386 to perform an instruction of another type if appropriate. After steps 384 or 386, the routine continues to step 388 to determine if there are more related instructions to be received from the user. If so, the routine receives another instruction in step 390 and then returns to step 364.

If it is determined in step 388 that there are not more instructions or in step 362 that the user is not authorized, or after steps 355 or 350, the routine continues to step 395 to determine whether to continue. If so, the routine returns to step 305, and if not the routine continues to step 399 and ends.

Figure 4:
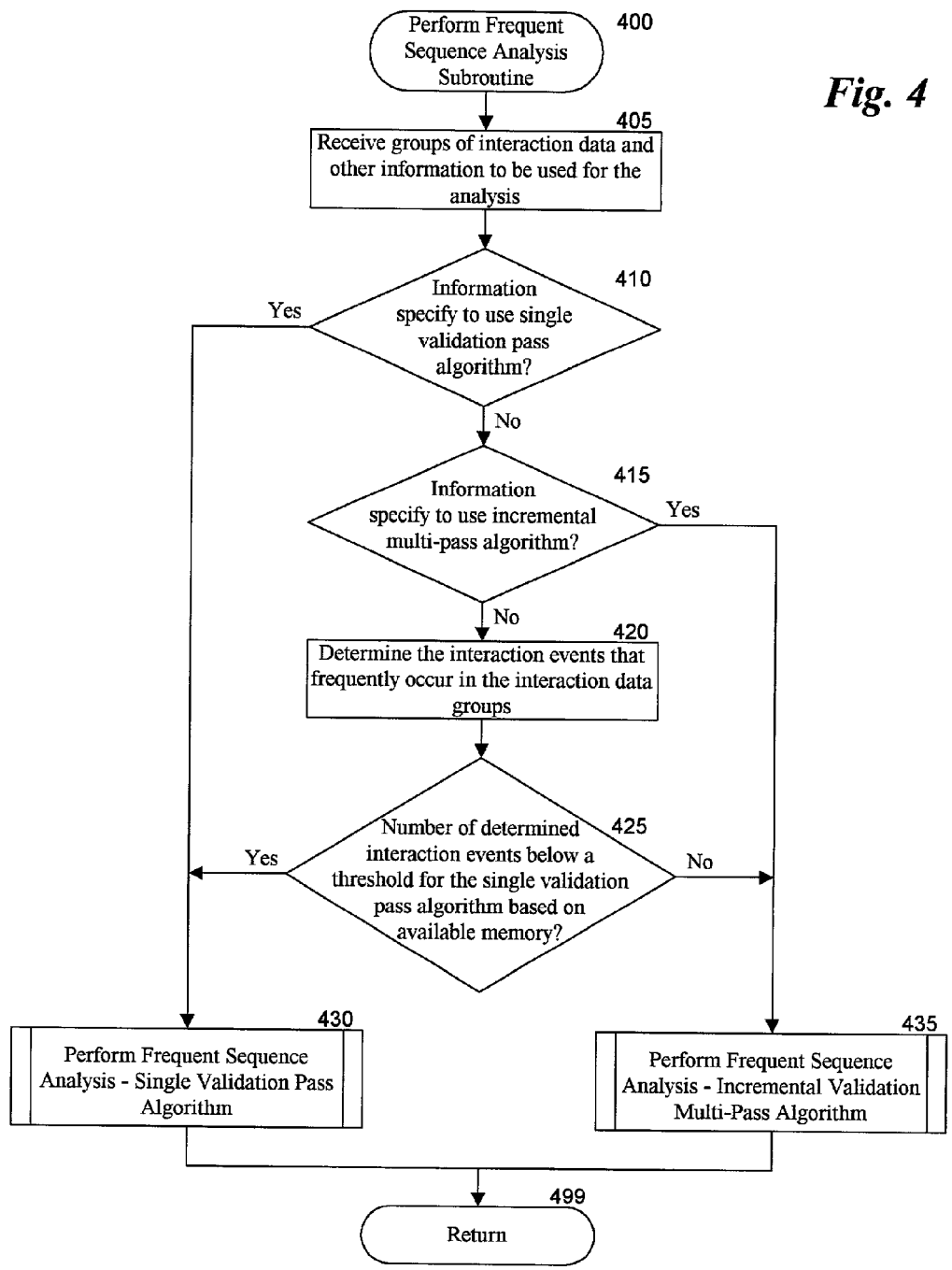
FIG. 4 is a flow diagram of an embodiment of the Perform Frequent Sequence Analysis subroutine.

FIG. 4 is a flow diagram of an embodiment of the Perform Frequent Sequence Analysis subroutine 400. The subroutine receives multiple groups of related interaction event data as well as other information related to the analysis (e.g., an indication of a frequentness threshold), and analyzes the groups of interaction data in the indicated manner to identify frequent sequences.

The routine begins at step 405 where it receives the groups of related interaction event data and other information to be used in performing the analysis. The routine then continues to step 410 to determine if the received information specifies that a technique for validating various candidate sequences of varying lengths at the same time in a single validation pass is to be used. If so, the routine continues to step 430 to execute the Perform Frequent Sequence Analysis—Single-Pass Validation Algorithm subroutine. If the single-pass validation algorithm is not specified, the subroutine instead continues to step 415 to determine if the received information specifies that an incremental multi-pass algorithm is instead to be used. If so, the routine continues to step 435 to execute the Perform Frequent Sequence Analysis—Incremental Multi-Pass Validation Algorithm subroutine.

If the incremental algorithm was also not specified, the subroutine continues to step 420 to determine the frequent singletons in the interaction event data groups. The subroutine then continues to step 425 to determine if the number of determined frequent singletons is below a threshold for use of the single-pass validation technique based on the available memory and other factors such as specified maximum sequence length. If so, the subroutine continues to step 430, and if not the subroutine continues to step 435. After steps 430 or 435, the subroutine continues to step 499 and returns.

Figure 5A:
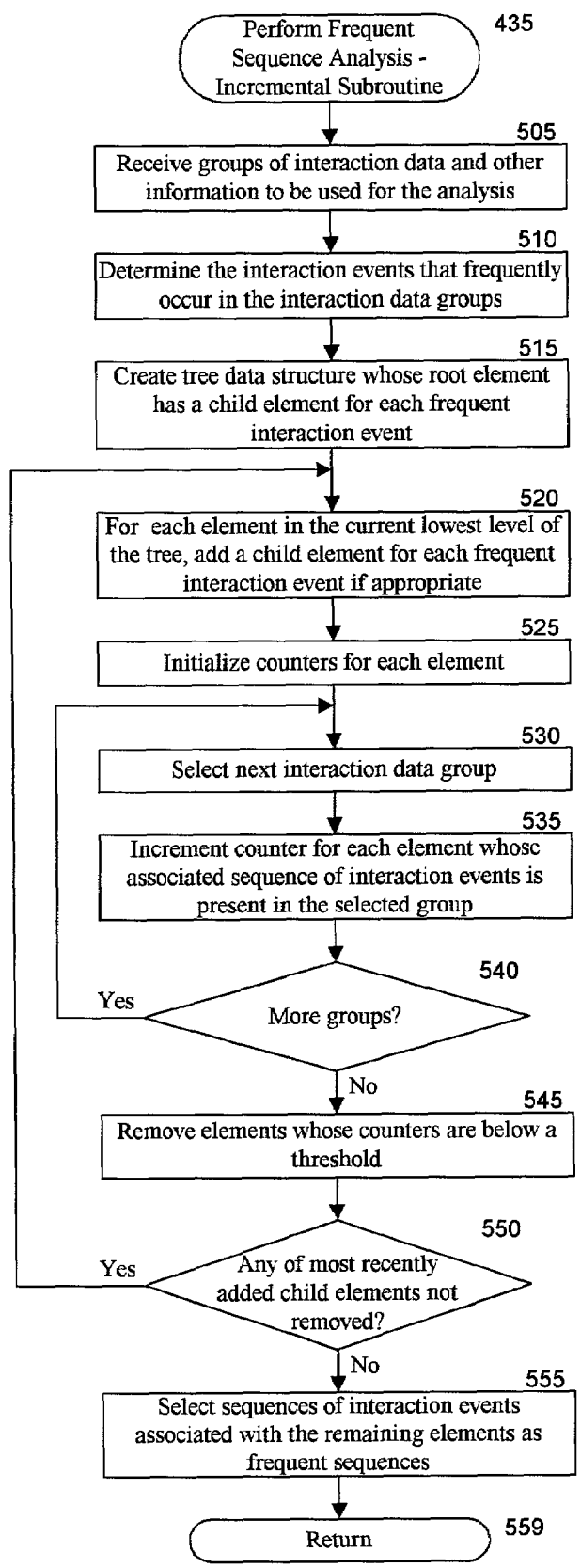
FIG. 5A is a flow diagram of an embodiment of the Perform Frequent Sequence Analysis—Incremental subroutine.

FIG. 5A is a flow diagram of an embodiment of the Perform Frequent Sequence Analysis—Incremental Validation subroutine 435. The subroutine receives groups of interaction data to be analyzed as well as other information related to the analysis, and incrementally determines frequent sequences of increasing lengths based on previously identified frequent sequences of shorter lengths. The subroutine begins in step 505 where the groups of related interaction event data and other analysis information is received. The subroutine then continues to step 510 to determine the frequent singletons in the interaction event data. In some embodiments, if this determination was already made in step 420 of FIG. 4, the frequent sequence information could be provided to the subroutine and if so the subroutine could skip step 510.

The subroutine next continues to step 515 to create a tree data structure whose root element has children elements for each of the singletons. The subroutine then continues to step 520 to add children elements for each of the frequent singletons to each element in the current lowest level of the tree if appropriate. In particular, for the second-level group of nodes (i.e., elements that are children of the children of the root element), elements are added for each of the frequent singletons. For third-level and lower elements, an element representing a frequent singleton is added as long as the sequence associated with that new element does not include any subsequences of shorter length that were previously determined not to be frequent.

After step 520, the subroutine continues to step 525 to initialize the counters that are associated with each element in the tree. The subroutine then continues to step 530 to select the next interaction event data group, beginning with the first. In step 535, the subroutine then determines each element in the tree data structure whose associated sequence of interaction events is present in the selected interaction event group, and increments the counter for those elements. As previously discussed, the determination of the sequences that are present in a group can be performed in a variety of ways, such as by using tokens or linked list data structures. After step 535, the subroutine continues to step 540 to determine if there are more groups of interaction events, and if so returns to step 530.

If there are not more groups, the subroutine continues to step 545 to remove the elements from the tree data structure whose counters are below a specified threshold. The subroutine then continues to step 550 to determine if any of the most recently added group of child elements was not removed. If so, then additional frequent sequences of greater length may be present, and the subroutine returns to step 520 to add additional child elements. If all of the child elements were removed, however, the subroutine continues instead to step 555 and selects the sequences of interaction events that are associated with each of the remaining elements of the tree as being the identified frequent sequences. The subroutine then continues to step 559 and returns.

Figure 5B:
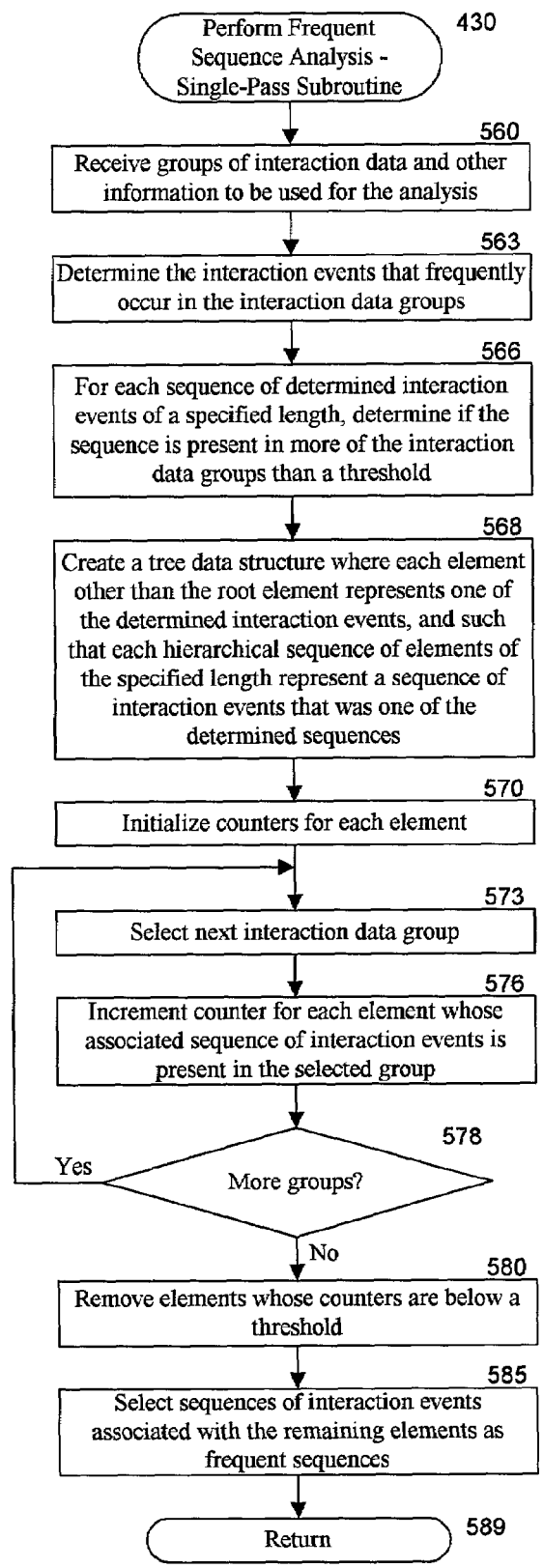
FIG. 5B is a flow diagram of an embodiment of the Perform Frequent Sequence Analysis—Single-Pass subroutine.

FIG. 5B is a flow diagram of an embodiment of the Perform Frequent Sequence Analysis—Single-Pass Validation subroutine 430. The subroutine receives groups of interaction event data to be analyzed as well as other information related to the analysis, determines a variety of candidate sequences of varying lengths, and validates all of the candidate sequences at the same time using a single pass of the interaction event groups. The subroutine begins at step 560 where it receives the interaction event data groups and other information. The subroutine then continues to step 563 to determine the frequent sequences in the interaction event groups. If the frequent sequences were previously determined in step 420 of FIG. 4, indications of these frequent singletons could instead be provided in some embodiments to the subroutine, and if so step 563 could be skipped.

The subroutine then continues to step 566 to generate each possible sequence of frequent singletons of a specified length (e.g., 2) and to determine if those sequences are present in more of the interaction event data groups than a specified threshold. The subroutine then continues to step 568 to create a tree data structure where each element other than the root element represents one of the frequent singletons, and in which the tree data structure includes an element that has an associated sequence for every sequence up to an optionally specified maximum sequence length as long as the associated sequence does not include any subsequences of the specified length that were not determined to be frequent subsequences.

After step 568, the subroutine continues to step 570 to initialize the counters for each element in the tree, and then continues to step 573 to select the next interaction event data group, beginning with the first. The subroutine then continues to step 576 to determine each of the associated sequences in the tree that are present in the selected interaction event group and to increment the counter for the elements associated with those sequences. As previously discussed, the determination of the sequences that are present in a group can be performed in a variety of ways, such as by using tokens or linked list data structures. The subroutine next continues to step 578 to determine if there are more interaction event groups, and if so returns to step 573. If there were no more groups, the subroutine continues instead to step 580 to remove elements from the tree whose counters are below a specified threshold. The subroutine then continues to step 585 to select the sequences of interaction events that are associated with the elements remaining in the tree as being the identified frequent sequences. The subroutine then continues to step 589 and returns.

Figure 6:
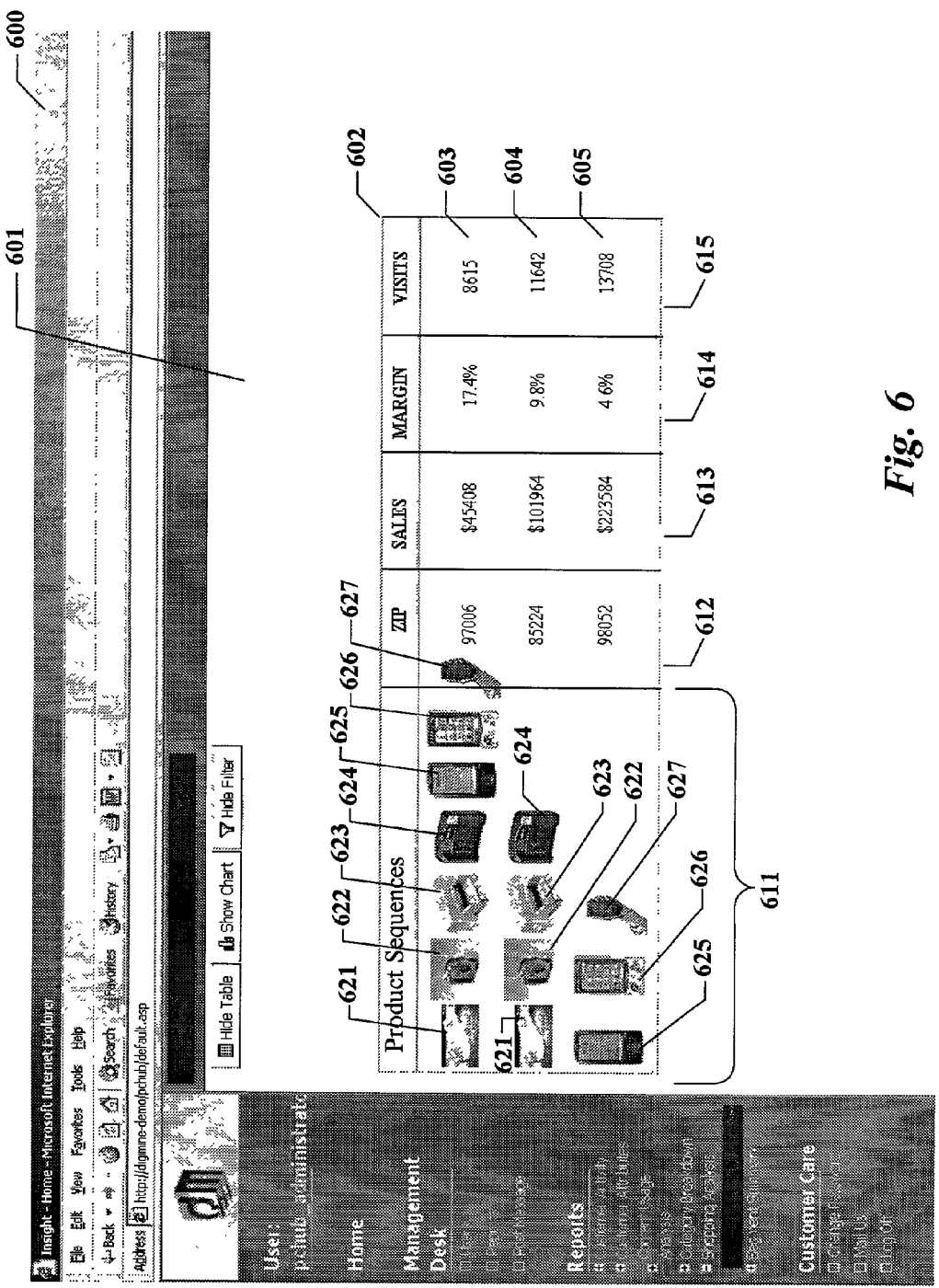
FIG. 6 illustrates an example generated report indicating determined frequent sequences.

FIG. 6 is a display diagram showing a sample report generated by the FSD system. The report is displayed in the client area 601 of a browser window 600. It will be appreciated, however, that the report may be displayed in a variety of other ways not involving a browser. The report is prepared by the system for a Website that is operated by a Web merchant. Most of the pages of the Website correspond to a single product sold by the Web merchant. These Web pages are numerous, and include Web pages for the products shown below in Table 1:

TABLE 1

| Reference Number | Item |
|---|---|
| 621 | Microsoft Natural Keyboard |
| 622 | QV7000SX Digital Camera |
| 623 | Hewlett-Packard DeskJet 842C Inkjet Printer |
| 624 | Ephoto 780C Digital Camera |
| 625 | Nino 210 Handheld 8 MB |
| 626 | Cassiopeia E-105 32 MB Palm |
| 627 | Palm III Connected Organizer PALMPILOT |

The report contains a table 602, comprised of rows 603–605 and columns 611–615. Each row corresponds to one of the top three most frequently visited sequences of Web pages within the subject Website. The product sequences column 611 contains images of the products whose Web pages make up the sequence of Web pages. The zip column 612 indicates the zip code from which this sequence of products is most frequently purchased. The sales column 613 indicates the total amount of sales attributable to purchases of this sequence of products. The margin column 614 indicates the aggregate markup on the products of the sequence. The visits column 615 indicates the number of times the sequence of Web pages for these products were visited. Row 605 represents the most frequently-visited sequence of Web pages on the subject Website. The product sequences field for row 605 identifies the pages in this group as the pages corresponding to items 625–627. The visits field of row 605 indicates that this sequence of Web pages was visited 13,708 times. This row further indicates that, when purchased together, these products produce sales of $223,684, that the aggregate margin on this sequence of products is 4.6% and that this sequence of products was purchased most frequently by users in the zip code 98062.

As noted above, rather than identifying sequences of specific Web pages that are frequently visited together, the facility may identify sequences of classes of Web pages that are visited together, such as by grouping the Web pages for products of a type of category into a single class. For example, the system may identify areas of the subject Website that are frequently visited in sequence. Table 2 below shows 14 areas of an example Website corresponding to categories of products, with each area comprised of one or more different Web pages on the Website.

Accessories
Digital Cameras
DVD Movies
Hardware
Modems and Networking
PDA

Software
Storage Drives and Memory
Training Tools
About the Company
Customer Service
Site Guide
Privacy Policy
Legal Notices Table 2

In this example, the systems identifies the sequences of areas of the subject Website that are visited most frequently. For example, the system may determine that the most-frequently visited sequence of Website areas is Digital Cameras and PDAs, the second most-frequently visited sequence of Web page areas is Software and DVD Movies, and the third most-frequently visited sequence of Website areas is Customer Service Site Guide and Privacy Policy.

In another illustrative embodiment, the system presents a display report of sequences of interactions with different sections of a Website that may each include a group of individual pages. Usage of a particular section of a site is the aggregation of all usage classified under that section. Example sections of a Website that acts as an online store could include the sections "Electronics," "Clothing," "Books," and "Customer Service." Web pages within a section may not necessarily be associated with products of the same category, such as the Electronics Web pages that may include Web pages for products of multiple categories (e.g., "stereos" and "TVs") or the Customer Service Web pages that may have no associated category.

Table 3 shows an example report indicating frequent sequences of sections whose Web pages were visited in a single visit. Blanks indicate that no Web pages from a section was viewed. Thus, for example, the first row indicates that 12,000 users visited the Electronics section of the Website followed by the Books section of the Website. Additional information can also be included in the report, such as information about the users that performed these sequences.

TABLE 3

| Number of Users | Electronics | Clothing | Books | Customer Service | Average Age | Percentage Male |
|---|---|---|---|---|---|---|
| 12,000 | YES | | YES | | 36 | 90% |
| 11,600 | | YES | YES | | 42 | 86% |
| 10,800 | | YES | YES | YES | 16 | 60% |
| 6,000 | YES | YES | | | 26 | 60% |

Once frequent sequences of events of interest are identified, the system can use measures other than frequency to display them. For example, the system can overlay other data such as demographics, user summaries, or other attributes pertaining to the users that participate in a frequent sequence. Furthermore, the system may use a primary measure of interestingness other than frequency. For example, a frequent event that is expected to be a part of any transaction sequence but does not appear in some may warrant interest and explanation for its occurrence.

Sequence reports can be unwieldy. If a sequence report is presented in a natural and interesting manner, however, the reports become much more informative than existing standardized reports, allowing users to quickly identify sequences of interest and directly access interaction events of the sequence. For example, each of the images displayed in the product sequences column 611 in FIG. 6 could have an associated hyperlink such that a user could select the image and then receive the Web page for the product. In addition, the sequences can be filtered by level of likely interestingness and presented in that order. Such an ordering enables the system to limit the number of sequences of interest to be displayed, and to more easily indicate sequences of interest.

Those skilled in the art will appreciate that the FSD system may identify any commonly-performed sequence of Web browsing activities, including visits to individual pages or to groups of pages, interactions with various controls, etc. Further, in addition to the web log data described in the illustrative embodiment of the invention, any data about usage of a service, access requests to databases or search engines, transaction and purchase information, and so forth, may be used as input for this invention. Embodiments of the system can report on any data that represents a sequence of events associated with a set of entities, such as users, causing the events.

Those skilled in the art will also appreciate that in some embodiments the functionality provided by the routines discussed above may be provided in alternate ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims. In addition, while certain aspects of the invention are presented below in certain claim forms, the inventors contemplate the various aspects of the invention in any available claim form. For example, while only one some aspects of the invention may currently be recited as being embodied in a computer-readable medium, other aspects may likewise be so embodied. Accordingly, the inventors reserve the right to add additional claims after filing the application to pursue such additional claim forms for other aspects of the invention.

We claim:

1. A computer-implemented method for identifying sequences of Web pages that are frequently visited in order non-consecutively during user browsing sessions, the Web pages of a sequence visited in order during a user browsing session when each Web page of the sequence is visited before a next Web page of the sequence is visited, the Web pages of a sequence visited non-consecutively during a user browsing session when at least one intervening Web page that is not part of the sequence is visited between the visits to the Web pages of the sequence, the method comprising:

receiving a Web server log generated by a Web server serving a Website having Web pages, the Web server log reflecting usage of the Website by users;

identifying multiple user browsing sessions from the received Web server log, each identified user browsing session indicating a series of Web pages from the Website that were consecutively visited in order by a user; and identifying sequences of the Web pages of the Website that were frequently visited in order non-consecutively in the identified user browsing sessions by determining a minimum threshold number of user browsing sessions;

determining multiple Web pages that are each visited during more of the identified user browsing sessions than the minimum threshold;

creating a tree data structure having a root node and having a child node of the root node for each of the determined Web pages, each of the determined Web pages represented by one of the children nodes, the children nodes forming a current lowest level of the tree data structure;

repeatedly expanding the tree data structure by adding a new lowest level of nodes that are children nodes to the nodes of a previous lowest level of the tree data structure, the added children nodes such that each of the determined Web pages has a node that represents that determined Web page that is added as a child node to each of the nodes of the previous level, each of the added children nodes having an associated sequence of Web pages consisting of the determined Web pages that are represented by the nodes in a path from the root node to that node;

determining the nodes of the tree data structure whose associated sequence of Web pages is visited in order non-consecutively during more of the identified user browsing sessions than the minimum threshold; and removing the nodes of the tree data structure that are not among the determined nodes, such that after creation of the tree data structure is completed, the sequences of Web pages that are associated with the nodes remaining in the tree data structure are the identified sequences of the Web pages that were frequently visited in order non-consecutively during the identified user browsing sessions.

2. The method of claim 1 including producing a report that includes the identified frequently visited sequences of Web pages.

3. The method of claim 1 wherein the acts of determining the nodes and removing the nodes are each performed after each act of adding a new lowest level of nodes, and wherein the act of determining the nodes includes:

initializing counters associated with each of the nodes other than the root node;

for each of the identified user browsing sessions, incrementing the counter associated with each node whose associated sequence of Web pages is visited in order non-consecutively during the identified user browsing session; and after the incrementing of the counters for each of the identified user browsing sessions, selecting the nodes of the tree data structure whose associated counters have values greater than the minimum threshold to be the determined nodes.

4. The method of claim 3 including creating for each of the determined Web pages a linked list data structure that is associated with that determined Web page, and wherein the incrementing of the counters associated with the nodes for a user browsing session includes:

for each of the linked list data structures, initializing the linked list to include an entry for the child node of the root node that represents the determined Web page with which the linked list is associated; and selecting in order each Web page in the series indicated by the user browsing session and, if that Web page is one of the determined Web pages, incrementing the counter associated with each of the nodes having entries in the linked list data structure associated with the one determined Web page;

selecting all children nodes of each node having an entry in the linked list data structure associated with the one determined Web page;

removing each of the entries in the linked list data structure associated with the one determined Web page; and for each of the selected children nodes, adding an entry for the selected child node to the linked list data structure associated with the determined Web page represented by the selected child node.

5. The method of claim 3 wherein the incrementing of the counters for an identified user browsing session includes:

associating a token with the root node; and selecting in order each Web page in the series indicated by the user browsing session and, if that Web page is one of the determined Web pages, for each node with an associated token, determining any children nodes of that node that represent the one determined Web page; and for each determined child node, if the node does not have an associated token, incrementing the counter associated with the determined child node; and associating a token with the determined child node.

6. The method of claim 3 including, after the adding of each new lowest level of nodes but before the determining of the nodes, removing the added nodes of the new lowest level whose associated sequence of Web pages includes a subsequence of Web pages that is not associated with any of the nodes that were part of the tree data structure before the adding.

7. The method of claim 3 wherein the repeated expansion of the tree data structure is ended when all of the nodes of an added lower level are removed.

8. The method of claim 1 wherein the repeated expansion of the tree data structure is ended when a maximum number of levels of nodes is reached.

9. The method of claim 1 including, after the determining of the multiple Web pages, determining sequences of two of the determined Web pages that are visited in order non-consecutively during more of the identified user browsing sessions than the minimum threshold, wherein during the adding of each new lowest level of nodes an added child node is removed if any consecutive two of the Web pages in the sequence of Web pages associated with that child node are not one of the determined sequences of two determined Web pages, and wherein the repeated expanding of the tree data structure is completed before the determining of the nodes.

10. The method of claim 9 wherein the determining of the sequences of two of the determined Web pages includes creating an array data structure having entries representing each possible sequence of two of the determined Web pages.

11. The method of claim 1 wherein the determining of the minimum threshold number of user browsing sessions is based on an indication received from a user.

12. A computer-implemented method for identifying frequent sequences of interaction events, the method comprising:
from at least one interaction log that contains data reflecting interactions with at least one executing application, identifying multiple interaction sessions each indicating an ordered series of related interaction events; and
identifying sequences of interaction events that frequently occur in the identified interaction sessions by
determining multiple interaction events that are each present in at least a first threshold number of the identified interaction sessions;
for each of the determined interaction events, identifying a sequence consisting of that interaction event as being a sequence of interaction events of length 1 that frequently occurs, the length 1 being a current longest length of identified sequences; and
repeatedly identifying sequences of interaction events of increasing lengths that frequently occur by,
for each of the identified sequences of a current longest length, generating candidate sequences of interaction events by adding one of the determined interaction events at the end of the identified sequence;
identifying the newly generated candidate sequences that are present in at least a second threshold number of the identified interaction sessions as being sequences of interaction events that frequently occur, each of the identified newly generated sequences having a current longest length that is one greater than the previous longest length;
if none of the newly generated candidate sequences are identified as sequences of interaction events that frequently occur, ending the repeated identification of the sequences; and wherein the identifying of the sequences of interaction events of length 1 includes creating a data structure with a root element and multiple children elements of the root element, each child element representing one of the determined interaction events and being associated with the identified sequence of length 1 that consists of that one determined interaction event, the children elements forming a current lowest level of the data structure, and wherein the generating of candidate sequences of a length one greater than the current longest length includes expanding the data structure by adding a new lowest level of elements to the data structure such that the added elements are children elements to the elements of a previous lowest level of the data structure, each of the added children elements representing one of the determined interaction events and having an associated sequence of interaction events that is one of the generated candidate sequences.

13. The method of claim 12 wherein each element other than the root element has an associated sequential path of elements between the root element and that element, a first element in each sequential path being a child element of the root element, each element in each sequential path other than the first element being a child element of the previous element in the sequential path, and wherein the sequence of interaction events that is associated with each node other than the root node consists of a sequence of the interaction events represented by the elements in the path associated with that node followed by the interaction event represented by that node.

14. The method of claim 12 wherein the identifying of the newly generated candidate sequences as sequences of interaction events that frequently occur includes determining the newly added children elements whose associated sequence of interaction events is present in at least the second threshold number of the identified interaction sessions.

15. The method of claim 14 wherein the determining of the newly added children elements whose associated sequence of interaction events is present in at least the second threshold number of the identified interaction sessions includes, for each of the identified interaction sessions:
initializing for each of the determined interaction events a linked list data structure that is associated with that determined interaction event such that the linked list data structure includes an entry for the child element of the root element that represents the determined interaction event with which the linked list is associated; and
selecting in order each interaction event in the identified interaction session and, if that interaction event is one of the determined interaction events,
indicating for each of the elements having entries in the linked list data structure associated with the one determined interaction event that the sequence of interaction events associated with the element is present in the identified interaction session;
selecting all children elements of each element having an entry in the linked list data structure associated with the one determined interaction event;
removing each of the entries in the linked list data structure associated with the one determined interaction event; and
for each of the selected children elements, adding an entry for the selected child element to the linked list data structure associated with the determined interaction event represented by the selected child element.

16. The method of claim 14 wherein the determining of the newly added children elements whose associated sequence of interaction events is present in at least the second threshold number of the identified interaction sessions includes, for each of the identified interaction sessions:
associating a token with the root element; and
selecting in order each interaction event in the identified interaction session and, if that interaction event is one of the determined interaction events,
for each element with an associated token, determining any children elements of that element that represent the one determined interaction event; and
for each determined child element, if the element does not have an associated token,
indicating that the sequence of interaction events associated with the determined child element is present in the identified interaction session; and
associating a token with the determined child element.

17. The method of claim 14 wherein the identifying of the newly generated candidate sequences as sequences of interaction events that frequently occur includes, after the determining of the newly added children elements whose associated sequence of interaction events is present in at least a second threshold number of the identified interaction sessions, removing the newly added children elements that are not among the determined elements.

18. The method of claim 12 wherein the second threshold number is the first threshold number.

19. The method of claim 12 wherein the generating of the candidate sequences is such that a candidate sequence of interaction events is not generated if the candidate sequence includes a subsequence of interaction events that is not one of the identified sequences of interaction events that frequently occurs.

20. The method of claim 12 including:
determining a maximum sequence length for the identified sequences of interaction events that frequently occur; and
ending the repeated identification of the sequences after the identifying of the newly generated candidate sequences that have a current longest length that is the specified maximum sequence length.

21. The method of claim 12 including providing indications of the identified sequences of interaction events that frequently occur to at least one user.

22. A computer-readable medium containing instructions that when executed cause a computing device to identify frequent sequences of interaction events by:
identifying multiple interaction sessions each indicating an ordered series of related interaction events; and
identifying sequences of interaction events that frequently occur in the identified interaction sessions by
determining multiple interaction events that are each present in at least a first threshold number of the identified interaction sessions;
for each of the determined interaction events, identifying a sequence consisting of that interaction event as being a sequence of interaction events of length 1 that frequently occurs, the length 1 being a current longest length of identified sequences; and
repeatedly identifying sequences of interaction events of increasing lengths that frequently occur by,
for each of the identified sequences of a current longest length, generating candidate sequences by adding one of the determined interaction events at the end of the identified sequence;
identifying the newly generated candidate sequences that are present in at least a second threshold number of the identified interaction sessions as being sequences of interaction events that frequently occur, each of the identified newly generated sequences having a current longest length that is one greater than the previous longest length;
if none of the newly generated candidate sequences are identified as sequences of interaction events that frequently occur, ending the repeated identification of the sequences; and wherein the identifying of the sequences of interaction events of length 1 includes creating a data structure with a root element and multiple children elements of the root element, each child element representing one of the determined interaction events and being associated with the identified sequence of length 1 that consists of that one determined interaction event, the children elements forming a current lowest level of the data structure, and wherein the generating of candidate sequences of a length one greater than the current longest length includes expanding the data structure by adding a new lowest level of elements to the data structure such that the added elements are children elements to the elements of a previous lowest level of the data structure, each of the added children elements representing one of the determined interaction events and having an associated sequence of interaction events that is one of the generated candidate sequences.

23. The computer-readable medium of claim 22 wherein the identifying of the newly generated candidate sequences as sequences of interaction events that frequently occur includes determining the newly added children elements whose associated sequence of interaction events is present in at least the second threshold number of the identified interaction sessions by, for each of the identified interaction sessions:
initializing for each of the determined interaction events a linked list data structure that is associated with that determined interaction event such that the linked list data structure includes an entry for the child element of the root element that represents the determined interaction event with which the linked list is associated; and
selecting in order each interaction event in the identified interaction session and, if that interaction event is one of the determined interaction events,
indicating for each of the elements having entries in the linked list data structure associated with the one determined interaction event that the sequence of interaction events associated with the element is present in the identified interaction session;
selecting all children elements of each element having an entry in the linked list data structure associated with the one determined interaction event;
removing each of the entries in the linked list data structure associated with the one determined interaction event; and
for each of the selected children elements, adding an entry for the selected child element to the linked list data structure associated with the determined interaction event represented by the selected child element.

24. The computer-readable medium of claim 22 wherein the identifying of the newly generated candidate sequences as sequences of interaction events that frequently occur includes determining the newly added children elements whose associated sequence of interaction events is present in at least the second threshold number of the identified interaction sessions by, for each of the identified interaction sessions:
associating a token with the root element; and
selecting in order each interaction event in the identified interaction session and, if that interaction event is one of the determined interaction events,
for each element with an associated token, determining any children elements of that element that represent the one determined interaction event; and
for each determined child element, if the element does not have an associated token,
indicating that the sequence of interaction events associated with the determined child element is present in the identified interaction session; and
associating a token with the determined child element.

25. The computer-readable medium of claim 22 wherein the instructions further cause the computing device to indicate the identified sequences of interaction events that frequently occur to at least one user.

26. A computing device for identifying frequent sequences of interaction events, comprising:
    an interaction event supplier component capable of identifying multiple interaction sessions each indicating an ordered series of related interaction events from at least one interaction log; and
    a frequent sequence analyzer component capable of identifying sequences of interaction events that frequently occur in the identified interaction sessions by
        determining multiple interaction events that are each present in at least a first threshold number of the identified interaction sessions;
        for each of the determined interaction events, identifying a sequence consisting of that interaction event as being a sequence of interaction events of length 1 that frequently occurs, the length 1 being a current longest length of identified sequences; and
        repeatedly identifying sequences of interaction events of increasing lengths that frequently occur by,
            for each of the identified sequences of a current longest length, generating candidate sequences by adding one of the determined interaction events at the end of the identified sequence;
            identifying the newly generated candidate sequences that are present in at least a second threshold number of the identified interaction sessions as being sequences of interaction events that frequently occur, each of the identified newly generated sequences having a current longest length that is one greater than the previous longest length;
            if none of the newly generated candidate sequences are identified as sequences of interaction events that frequently occur, ending the repeated identification of the sequences; and wherein the identifying of the sequences of interaction events of length 1 includes creating a data structure with a root element and multiple children elements of the root element, each child element representing one of the determined interaction events and being associated with the identified sequence of length 1 that consists of that one determined interaction event, the children elements forming a current lowest level of the data structure, and wherein the generating of candidate sequences of a length one greater than the current longest length includes expanding the data structure by adding a new lowest level of elements to the data structure such that the added elements are children elements to the elements of a previous lowest level of the data structure, each of the added children elements representing one of the determined interaction events and having an associated sequence of interaction events that is one of the generated candidate sequences.

27. The computing device of claim 26 including a frequent sequence indication generator component capable of providing to at least one user indications of the identified sequences of interaction events that frequently occur.

28. The computing device of claim 26 wherein the identifying of the newly generated candidate sequences as sequences of interaction events that frequently occur includes determining the newly added children elements whose associated sequence of interaction events is present in at least the second threshold number of the identified interaction sessions by, for each of the identified interaction sessions:
    initializing for each of the determined interaction events a linked list data structure that is associated with that determined interaction event such that the linked list data structure includes an entry for the child element of the root element that represents the determined interaction event with which the linked list is associated; and
    selecting in order each interaction event in the identified interaction session and, if that interaction event is one of the determined interaction events,
        indicating for each of the elements having entries in the linked list data structure associated with the one determined interaction event that the sequence of interaction events associated with the element is present in the identified interaction session;
        selecting all children elements of each element having an entry in the linked list data structure associated with the one determined interaction event;
        removing each of the entries in the linked list data structure associated with the one determined interaction event; and
        for each of the selected children elements, adding an entry for the selected child element to the linked list data structure associated with the determined interaction event represented by the selected child element.

29. The computing device of claim 26 wherein the identifying of the newly generated candidate sequences as sequences of interaction events that frequently occur includes determining the newly added children elements whose associated sequence of interaction events is present in at least the second threshold number of the identified interaction sessions by, for each of the identified interaction sessions:
    associating a token with the root element; and
    selecting in order each interaction event in the identified interaction session and, if that interaction event is one of the determined interaction events,
        for each element with an associated token, determining any children elements of that element that represent the one determined interaction event; and
        for each determined child element, if the element does not have an associated token,
            indicating that the sequence of interaction events associated with the determined child element is present in the identified interaction session; and
            associating a token with the determined child element.

30. A computer-implemented method for identifying frequent sequences of interaction events, the method comprising:
    from at least one interaction log that contains data reflecting interactions with at least one executing application, identifying multiple interaction sessions each indicating an ordered series of related interaction events; and
    identifying sequences of interaction events that frequently occur in the identified interaction sessions by
        determining sequences of interaction events each having a specified number of multiple interaction events such that the determined sequences are each present in at least a first threshold number of the identified interaction sessions;
        generating candidate sequences of interaction events having varying lengths, each generated candidate sequence such that each subsequence of the candidate sequence that is of a length that is the specified number is one of the determined sequences, by adding at least one interaction event at the end of each of the determined sequences and by repeatedly generating additional sequences by adding at least one interaction event at the end of previously generated sequences;

identifying the generated candidate sequences that are present in at least a second threshold number of the identified interaction sessions as being sequences of interaction events that frequently occur; wherein the generating of the candidate sequences of interaction events includes creating a multi-level data structure having a root element and a plurality of other elements, a first of the levels of the data structure having elements that are children elements of the root element, each of the other levels having elements that are children elements of elements of a previous level, and each of the other elements representing one of the interaction events and being associated with one of the generated candidate sequences; and wherein each element other than the root element has an associated sequential path of elements between the root element and that element, a first element in each sequential path being a child element of the root element, each element in each sequential path other than the first element being a child element of the previous element in the sequential path, and wherein the sequence of interaction events that is associated with each node other than the root node consists of a sequence of the interaction events represented by the elements in the path associated with that node followed by the interaction event represented by that node.

31. The method of claim 30 wherein the identifying of the generated candidate sequences as being sequences of interaction events that frequently occur includes determining the elements of the data structure whose associated sequence of interaction events is present in at least the second threshold number of the identified interaction sessions.

32. The method of claim 31 wherein the determining of the elements of the data structure whose associated sequence of interaction events is present in at least the second threshold number of the identified interaction sessions includes, for each of the identified interaction sessions:

for each interaction event represented by a child element of the root element, initializing a linked list data structure that is associated with that interaction event such that the linked list data structure includes an entry for the child element of the root element that represents the interaction event with which the linked list is associated; and selecting in order each interaction event in the identified interaction session and, if that interaction event is one of the interaction events having an associated linked list data structure, indicating for each of the elements having entries in the associated linked list data structure that the sequence of interaction events associated with that element is present in the identified interaction session;

selecting all children elements of each element having an entry in the associated linked list data structure;

removing each of the entries in the associated linked list data structure; and for each of the selected children elements that represent an interaction event that has an associated linked list data structure, adding an entry for the selected child element to that linked list data structure.

33. The method of claim 31 wherein the determining of the elements of the data structure whose associated sequence of interaction events is present in at least the second threshold number of the identified interaction sessions includes, for each of the identified interaction sessions:

associating a token with the root element; and selecting in order each interaction event in the identified interaction session and for each selected interaction event, for each element with an associated token, determining any children elements of that element that represent the selected interaction event; and for each determined child element, if the element does not have an associated token, indicating that the sequence of interaction events associated with the determined child element is present in the identified interaction session; and associating a token with the determined child element.

34. The method of claim 31 wherein the identifying of the generated candidate sequences as being sequences of interaction events that frequently occur includes, after the determining of the elements of the data structure whose associated sequence of interaction events is present in at least the second threshold number of the identified interaction sessions, removing the elements of the data structure that are not among the determined elements.

35. The method of claim 30 wherein the second threshold number is the first threshold number.

36. The method of claim 30 including:

determining a maximum sequence length for the identified sequences of interaction events that frequently occur; and ending the repeated generation of the additional sequences after the generating of candidate sequences whose length is the specified maximum sequence length.

37. The method of claim 30 including providing indications of the identified sequences of interaction events that frequently occur to at least one user.

38. A computer-readable medium containing instructions that when executed cause a computing device to identify frequent sequences of interaction events by:

from at least one interaction log that contains data reflecting interactions with at least one executing application, identifying multiple interaction sessions each indicating an ordered series of related interaction events; and identifying sequences of interaction events that frequently occur in the identified interaction sessions by determining sequences of interaction events each having a specified number of multiple interaction events such that the determined sequences are each present in at least a first threshold number of the identified interaction sessions;

generating candidate sequences of interaction events of varying lengths, each generated candidate sequence such that each subsequence of the candidate sequence that is of a length that is the specified number is one of the determined sequences, by adding at least one interaction event at the end of each of the determined sequences and by repeatedly generating additional sequences by adding at least one interaction event at the end of previously generated sequences;

identifying the generated candidate sequences that are present in at least a second threshold number of the identified interaction sessions as being sequences of interaction events that frequently occur; wherein the generating of the candidate sequences of interaction events includes creating a multi-level data structure having a root element and a plurality of other elements, a first of the levels of the data structure having elements that are children elements of the root element, each of the other levels having elements that are children elements of elements of a previous level, and each of the other elements representing one of the interaction events and being associated with one of the generated candidate sequences; and wherein each element other than the root element has an associated sequential path of elements between the root element and that element, a first element in each sequential path being a child element of the root element, each element in each sequential path other than the first element being a child element of the previous element in the sequential path, and wherein the sequence of interaction events that is associated with each node other than the root node consists of a sequence of the interaction events represented by the elements in the path associated with that node followed by the interaction event represented by that node.

39. The computer-readable medium of claim 38 wherein the instructions further cause the computing device to indicate the identified sequences of interaction events that frequently occur to at least one user.

40. A computing device for identifying frequent sequences of interaction events, comprising:
   an interaction event supplier component capable of identifying multiple interaction sessions each indicating an ordered series of related interaction events from at least one interaction log; and
   a frequent sequence analyzer component capable of identifying sequences of interaction events that frequently occur in the identified interaction sessions by
      determining sequences of interaction events each having a specified number of multiple interaction events such that the determined sequences are each present in at least a first threshold number of the identified interaction sessions;
      generating candidate sequences of interaction events of varying lengths, each generated candidate sequence such that each subsequence of the candidate sequence that is of a length that is the specified number is one of the determined sequences, by adding at least one interaction event at the end of each of the determined sequences and by repeatedly generating additional sequences by adding at least one interaction event at the end of previously generated sequences; and
      identifying the generated candidate sequences that are present in at least a second threshold number of the identified interaction sessions as being sequences of interaction events that frequently occur.

41. The computing device of claim 40 including a frequent sequence indication generator component capable of providing to at least one user indications of the identified sequences of interaction events that frequently occur.

42. A data structure stored in a memory, to be accessed by an application program being executed on a data processing system for use in identifying frequent sequences of interaction events, the data structure containing a root element and a plurality of other elements, a first level of the data structure having elements that are children elements of the root element, each of multiple other levels having elements that are children elements of elements of a previous level, each of the plurality of other elements representing one of the interaction events and being associated with a candidate sequence, so that after the elements are scored while validating the data structure against groups of related interaction events, the candidate sequences that are associated with elements whose score is above a threshold can be selected as the identified frequent sequences of interaction events; wherein each element other than the root element has an associated sequential path of elements between the root element and that element, a first element in each sequential path being a child element of the root element, each element in each sequential path other than the first element being a child element of the previous element in the sequential path, and wherein the candidate sequence of interaction events that is associated with each node other than the root node consists of a sequence of the interaction events represented by the elements in the path associated with that node followed by the interaction event represented by that node; and for each interaction event represented by a child element of the root element, a linked list data structure that is associated with that interaction event such that the linked list data structure includes entries for at least one of the other elements, so that as the data structure is validated against one of the groups of interaction events by selecting in order each interaction event in the group, if the selected interaction event is one of the interaction events having an associated linked list data structure, the score of each of the elements having entries in the associated linked list data structure can be incremented.

43. The data structure of claim 42 wherein at least some of the elements have associated tokens,
   so that as the data structure is validated against one of the groups of interaction events by selecting in order each interaction event in the group, the score can be incremented for each element that represents the selected interaction event, that lacks an associated token, and that is a child element of an element with an associated token.

\* \* \* \* \*